United States Patent
Kobayashi

(10) Patent No.: US 9,658,451 B2
(45) Date of Patent: May 23, 2017

(54) HEAD MOUNTED DISPLAY, METHOD OF CONTROLLING HEAD MOUNTED DISPLAY, AND IMAGE DISPLAY SYSTEM

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/467,970

(22) Filed: Aug. 25, 2014

(65) Prior Publication Data
US 2015/0061974 A1 Mar. 5, 2015

(30) Foreign Application Priority Data
Sep. 5, 2013 (JP) ................. 2013-183630

(51) Int. Cl.
G09G 5/00 (2006.01)
G02B 27/01 (2006.01)
G06F 3/00 (2006.01)
G06T 19/00 (2011.01)
H04M 1/725 (2006.01)

(52) U.S. Cl.
CPC ............ *G02B 27/017* (2013.01); *G06F 3/00* (2013.01); *G06T 19/006* (2013.01); *H04M 1/7253* (2013.01); *G02B 2027/014* (2013.01); *G02B 2027/0141* (2013.01)

(58) Field of Classification Search
CPC ............ G02B 27/017; G02B 2027/014; G02B 2027/0141; G06F 1/163; G06F 3/012; G06F 3/013; G06F 3/00; G06T 19/006; H04M 1/7253

USPC ............................................................. 345/8
See application file for complete search history.

(56) References Cited

U.S. PATENT DOCUMENTS

| | | | |
|---|---|---|---|
| 2010/0053069 A1* | 3/2010 | Tricoukes | G06F 3/1431 345/156 |
| 2012/0302289 A1* | 11/2012 | Kang | G06F 3/011 455/557 |
| 2013/0002701 A1 | 1/2013 | Ida | |
| 2013/0187835 A1* | 7/2013 | Vaught | G06K 9/00604 345/8 |
| 2014/0015826 A1* | 1/2014 | Licata | G06T 15/04 345/419 |
| 2014/0167986 A1* | 6/2014 | Parada | G01C 21/365 340/905 |

(Continued)

FOREIGN PATENT DOCUMENTS

| | | |
|---|---|---|
| JP | A-2012-44429 | 3/2012 |
| JP | A-2013-92781 | 5/2013 |
| JP | A-2013-93705 | 5/2013 |

(Continued)

*Primary Examiner* — Amr Awad
*Assistant Examiner* — Aaron Midkiff
(74) *Attorney, Agent, or Firm* — Oliff PLC

(57) ABSTRACT

A head mounted display which allows a user to visually recognize a virtual image and external scenery, includes a generation unit that generates a list image by changing an arrangement of a plurality of images of an external apparatus connected to the head mounted display to an arrangement for the head mounted display, and an image display unit that allows the user to visually recognize the generated list image as the virtual image.

11 Claims, 14 Drawing Sheets

(56) References Cited

U.S. PATENT DOCUMENTS

2015/0138081 A1    5/2015   Iwatsu et al.

FOREIGN PATENT DOCUMENTS

| JP | 2013-125247 A | 6/2013 |
| WO | 2013/088725 A1 | 6/2013 |
| WO | 2014/129105 A1 | 8/2014 |

* cited by examiner

HEAD MOUNTED DISPLAY, METHOD OF CONTROLLING HEAD MOUNTED DISPLAY, AND IMAGE DISPLAY SYSTEM

BACKGROUND

1. Technical Field

The present invention relates to a head mounted display.

2. Related Art

A head mounted display (HMD) which is a display mounted on the head is known. The head mounted display generates image light representing an image by using, for example, a liquid crystal display and a light source, and guides the generated image light to user's eyes by using a projection optical system or a light guide plate, thereby allowing the user to recognize a virtual image. The head mounted display includes a wired interface such as a universal serial bus (USB) or a wireless interface such as a wireless LAN, and thus can be connected to an external apparatus such as a portable information terminal (for example, a smart phone or a tablet).

JP-A-2013-92781 discloses a configuration in which a display destination is determined depending on open and close states of a portable information terminal when a predetermined function mounted in the portable information terminal is displayed on either a display screen of the portable information terminal or a display screen of a head mounted display. JP-A-2012-44429 discloses a configuration in which a head mounted display displays partial image which is at least a partial region of an image which is currently displayed on a portable information terminal. JP-A-2013-93705 discloses a configuration in which a head mounted display displays a part of an image indicated by image data received from an information terminal on the basis of head posture information of a user.

In the technique disclosed in JP-A-2013-92781, there is a problem in that there is no sufficient study of a method of displaying a predetermined function mounted in the portable information terminal on a display screen of the head mounted display. In addition, in the technique disclosed in JP-A-2012-44429, there is a problem in that, since a partial image of the portable information terminal is displayed on the head mounted display without change, a front side of the eyes of a user is blocked by the partial image, and thus the user may feel uncomfortable. Similarly, in the technique disclosed in JP-A-2013-93705, there is a problem in that, since a part of an image indicated by image data from the information terminal is displayed on the head mounted display without change, a front side of the eye of a user is impeded by the image, and thus the user may feel uncomfortable.

For this reason, it is desirable to display a display screen of an external apparatus on the head mounted display by using a display mode of an image which is suitable for the head mounted display. In addition, in the head mounted display, there are various demands for improvement of usability, improvement of versatility, improvement of convenience, improvement of reliability, and manufacturing cost reduction.

SUMMARY

An advantage of some aspects of the invention is to solve at least a part of the problems described above, and the invention can be implemented as the following aspects.

(1) An aspect of the invention provides a head mounted display which allows a user to visually recognize a virtual image and external scenery. The head mounted display includes a generation unit that generates a list image by changing an arrangement of a plurality of images of an external apparatus connected to the head mounted display to an arrangement for the head mounted display; and an image display unit that allows the user to visually recognize the generated list image as the virtual image. According to the head mounted display of the aspect, the image display unit allows the user to visually recognize the list image which is generated by changing an arrangement of the plurality of images of the external apparatus to an arrangement for the head mounted display, as the virtual image. The image of the external apparatus indicates an image displayed on a display screen of the external apparatus. Changing an arrangement of the images to an arrangement for the head mounted display indicates, that is, setting a display screen of the external apparatus to an image display mode suitable for the head mounted display. As a result, the image display unit can display the display screen of the external apparatus on the head mounted display by using the image display mode suitable for the head mounted display.

(2) The head mounted display of the aspect may further include an acquisition unit that acquires the plurality of images from the external apparatus, and the generation unit may generate the list image by changing a position of an arrangement of the plurality of acquired images to a position avoiding a central part of the virtual image. According to the head mounted display of this aspect, the image display unit displays the list image in which a position of an arrangement of the images is changed to a position avoiding the central part of the virtual image, and thus it is possible to prevent a front side of the eyes of a user from being blocked by the images. As a result, the image display unit can display the display screen of the external apparatus on the head mounted display by using the image display mode suitable for the head mounted display.

(3) The head mounted display of the aspect may further include an operation acquisition unit that acquires an operation on the list image performed by the user; and a notification unit that notifies the external apparatus of at least one of positional information for identifying a position of a certain image in the external apparatus and link destination information for identifying a link destination of the certain image in the external apparatus, when the acquired operation is performed on the certain image. According to the head mounted display of this aspect, the notification unit notifies the external apparatus of at least one of the positional information and the link destination information when a certain image of the list image displayed on the head mounted display is operated. The positional information is information for identifying a position of the certain image in the external apparatus, and thus can be written in a character string by using coordinates or the like and has a small volume of data. Similarly, the link destination information is information for identifying a link destination of the certain image, and thus can be written in a character string by using a file path or the like and has a small volume of data. Therefore, according to the head mounted display of the aspect, it is possible to reduce a data volume of information which is transmitted from the head mounted display to the external apparatus and thus to reduce a communication load.

(4) In the head mounted display of the aspect, the acquisition unit may acquire the plurality of images, and at least one of positional information for identifying each of positions of the plurality of images in the external apparatus and link destination information for identifying each of link destinations of the plurality of images in the external apparatus; when the list image is generated, the generation unit may store the images in correlation with the positional information of the images or the link destination information of the images; and the notification unit may notify the external apparatus of at least one of the positional information of the certain image and the link destination information of the certain image by using the correlation. According to the head mounted display of this aspect, the notification unit can easily perform a notification of positional information or link destination information of an operated image by using a correlation between an image and positional information of the image or link destination information of the image.

(5) In the head mounted display of the aspect, when the screen list image is generated, the generation unit may further perform at least one of change of shapes, change of transmittance, change of colors, change of sizes, and addition of decorations, on the plurality of acquired images. According to the head mounted display of this aspect, the generation unit performs at least one of change of shapes, change of transmittance, change of colors, change of sizes, and addition of decorations, on the images. As a result, the image display unit can display a display screen of the external apparatus in an image display mode more suitable for the head mounted display.

(6) In the head mounted display of the aspect, the generation unit may generate the list image by extracting at least some images satisfying a predetermined condition from among the plurality of acquired images, and by changing an arrangement of the extracted images. According to the head mounted display of this aspect, the generation unit can filter images which are disposed in a list image, by using a predetermined condition. For example, if a predetermined condition may be arbitrarily set by a user, the image display unit allows a user to visually recognize a list image which is filtered so that the user's favorite icon images remain, and thus it is possible to improve convenience for the user.

(7) In the head mounted display of the aspect, the plurality of images may include at least an icon image for activating an application installed in the external apparatus. According to the head mounted display of this aspect, an image is made to include an icon image for activating an application installed in the external apparatus.

(8) In the head mounted display of the aspect, the generation unit may further dispose a plurality of images of the head mounted display in the list image in a mode in which the images of the head mounted display can be differentiated from the plurality of images of the external apparatus. According to the head mounted display of this aspect, the image display unit allows a user to visually recognize both the images of the external apparatus and the images of the head mounted display in a mode in which the images can be differentiated from each other, and thus can improve convenience for the user.

(9) Another aspect of the invention provides an image display system. The image display system includes a head mounted display that allows a user to visually recognize a virtual image and external scenery; and an external apparatus that is connected to the head mounted display. The external apparatus includes a transmission unit that acquires a plurality of images of the external apparatus and transmits the plurality of acquired images to the head mounted display. In addition, the head mounted display includes a generation unit that generates a list image by changing an arrangement of the plurality of images of the external apparatus to an arrangement for the head mounted display; and an image display unit that allows the user to visually recognize the generated list image as the virtual image.

All of the plurality of constituent elements in the respective aspects of the invention described above are not essential, and some of the plurality of constituent elements may be changed, deleted, exchanged with other new constituent elements, and partially deleted from limited content thereof, as appropriate, in order to solve some or all of the above-described problems or in order to achieve some or all of the effects described in the present specification. In addition, in order to solve some or all of the above-described problems or in order to achieve some or all of the effects described in the present specification, some or all of the technical features included in one aspect of the invention described above may be combined with some or all of the technical features included in another aspect of the invention described above, and as a result may be treated as an independent aspect of the invention.

For example, one aspect of the invention may be implemented as a device which includes some or both of the two constituent elements including the generation unit and the image display unit. In other words, this device may or may not include the generation unit. Further, the device may or may not include the image display unit. This device may be implemented as, for example, a head mounted display, but may be implemented as devices other than the head mounted display. Some or all of the above-described technical features of each aspect of the head mounted display are applicable to the device.

The invention may be implemented in various aspects, and may be implemented in aspects such as a head mounted display, a control method for the head mounted display, an image display system using the head mounted display, a computer program for implementing functions of the method, the display, and the system, and a recording medium for recording the computer program thereon.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of Image Display System

Figure 1:
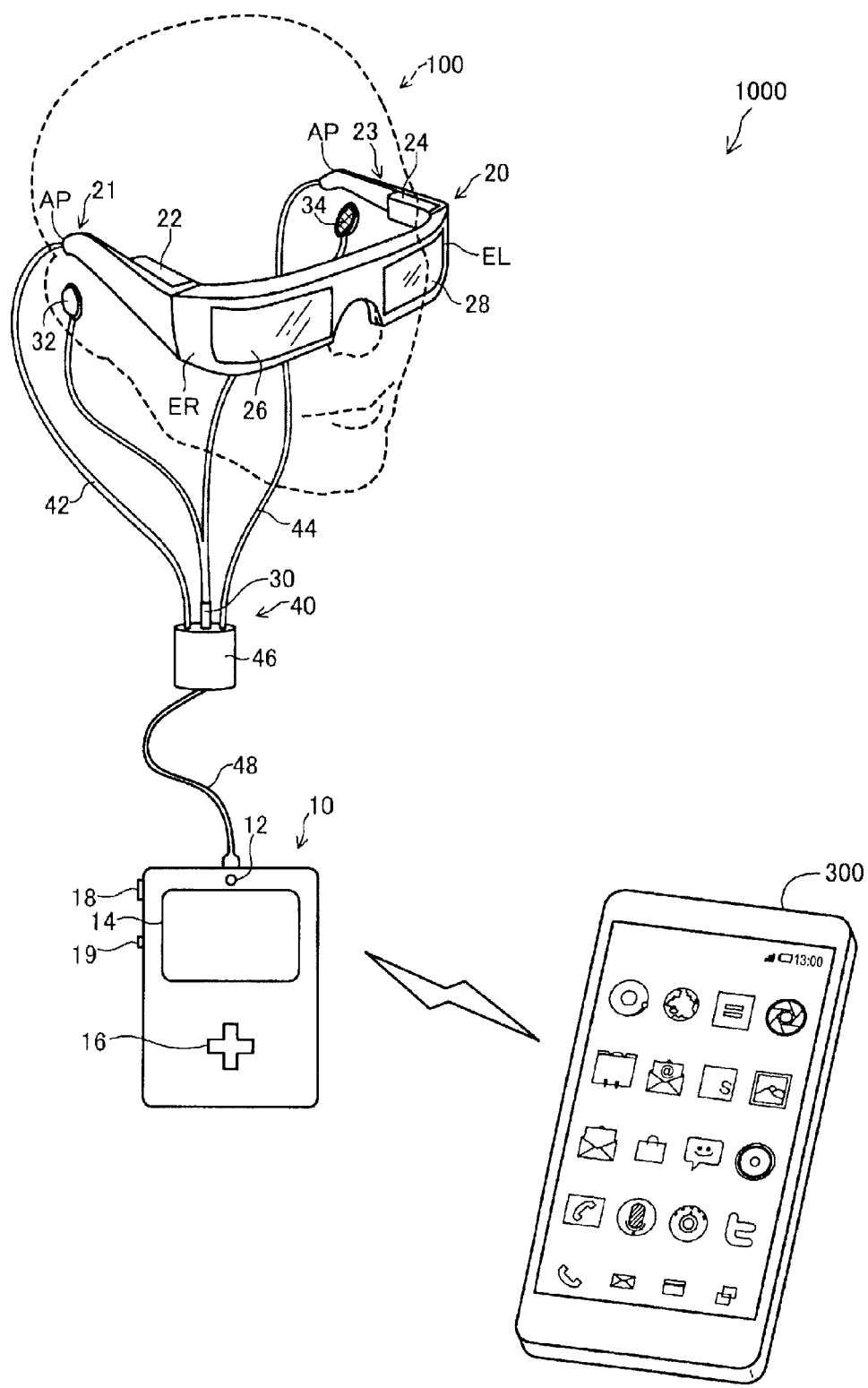
FIG. 1 is a diagram illustrating a schematic configuration of an image display system according to an embodiment of the invention.

FIG. 1 is a diagram illustrating a schematic configuration of an image display system 1000 according to an embodiment of the invention. The image display system 1000 includes a head mounted display 100 and a portable information terminal 300 as an external apparatus. The image display system 1000 is a system which displays a display screen of the portable information terminal 300 on the head mounted display 100 by using a display mode of an image which is suitable for the head mounted display 100.

The head mounted display 100 is a display mounted on the head and also called an HMD. The head mounted display 100 according to the present embodiment is an optical transmission type head mounted display which allows a user to visually recognize a virtual image and also to directly visually recognize external scenery. The portable information terminal 300 is a portable information communication terminal. In the present embodiment, a smart phone is an example of the portable information terminal. The head mounted display 100 and the smart phone 300 are connected to each other so as to perform wireless communication or wired communication.

A-2. Configuration of Head Mounted Display

Figure 2:
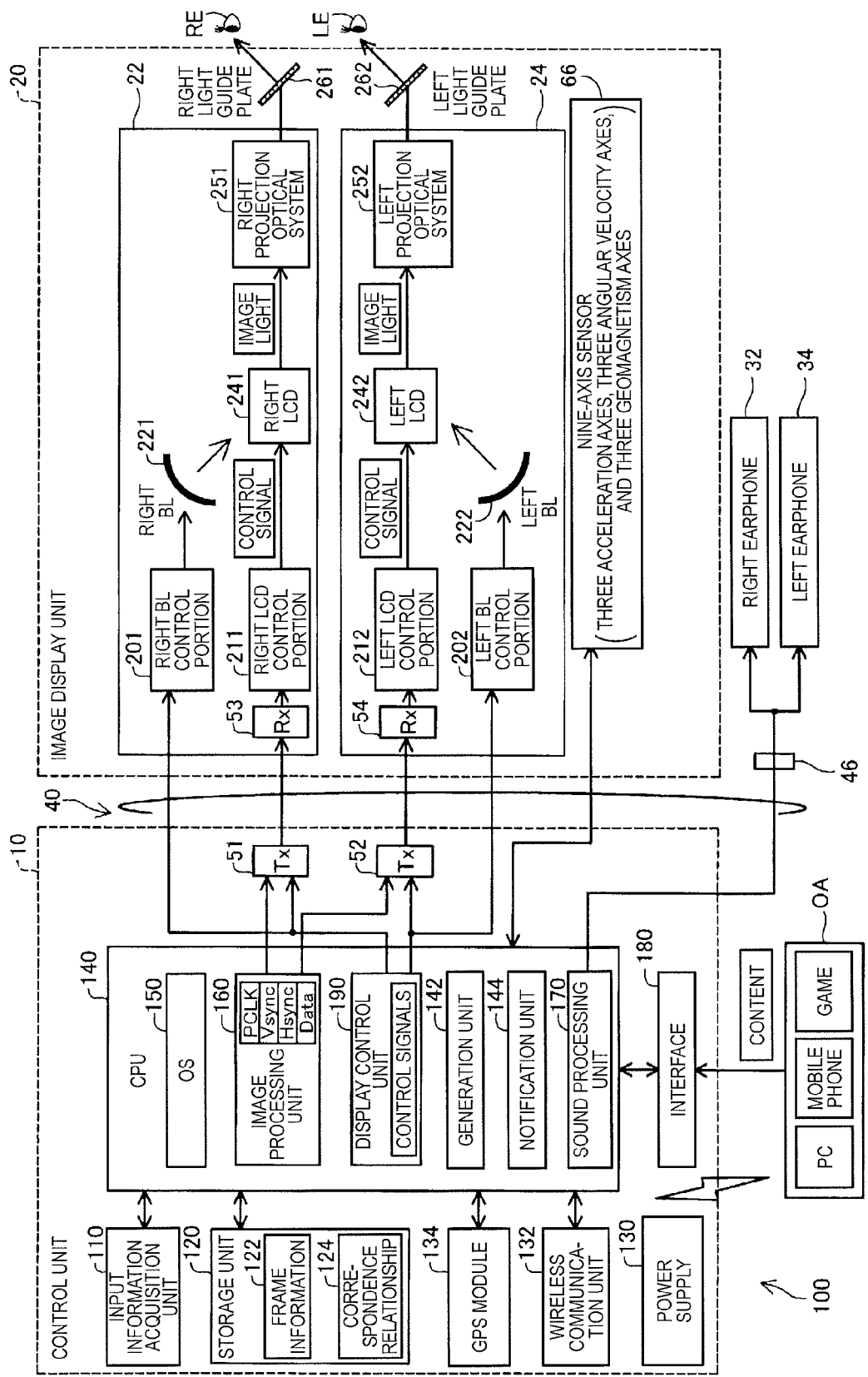
FIG. 2 is a functional block diagram illustrating a configuration of a head mounted display.

FIG. 2 is a functional block diagram illustrating a configuration of the head mounted display 100. As illustrated in FIGS. 1 and 2, the head mounted display 100 includes an image display unit 20 which allows the user to visually recognize a virtual image in a state of being mounted on the head of the user, and a control unit 10 (a controller) which controls the image display unit 20. The image display unit 20 and the control unit 10 are connected to each other via a connection unit 40, and transmit various signals via the connection unit 40. The connection unit 40 employs a metal cable or an optical fiber.

A-2-1. Configuration of Control Unit

The control unit 10 is a device which controls the head mounted display 100. The control unit 10 includes an input information acquisition unit 110, a storage unit 120, a power supply 130, a wireless communication unit 132, a GPS module 134, a CPU 140, an interface 180, and transmission units (Tx) 51 and 52, and the above-described constituent elements are connected to each other via a bus (not illustrated) (FIG. 2).

The input information acquisition unit 110 acquires a signal based on an operation input which is performed on, for example, an input device such as a touch pad, a cross key, a foot switch (a switch operated by the leg of the user), a gesture detection device (which detects a gesture of the user with a camera or the like, and acquires an operation input based on a command correlated with the gesture), a visual line detection device (which detects a visual line of the user with an infrared sensor or the like, and acquires an operation input based on a command correlated with a motion of the visual line), or a microphone. In addition, when a visual line is detected, a finger tip of the user, a ring worn by the user, a tool held with the user's hand, or the like may be used as a marker for detecting a motion. If an operation input is acquired by using the foot switch, the visual line detection device, or the microphone, it is possible to considerably improve convenience for the user in a case where of using the head mounted display 100 in sites (for example, a medical site, or a site requiring hand work in a construction or manufacturing industry) where it is difficult for the user to perform an operation with the hand.

The storage unit 120 is constituted by a ROM, a RAM, a DRAM, a hard disk, or the like. The storage unit 120 includes frame information 122 and a correspondence relationship 124. The frame information 122 stores at least one frame. A frame stored in the frame information 122 is used as a frame for rearranging an image in a rearrangement process (FIG. 4) performed by the generation unit 142. Here, the rearrangement process is a process in which an arrangement of a plurality of images of the smart phone 300 is set to an image display mode suitable for the head mounted display 100, and arranged images are displayed on the head mounted display 100.

In the present embodiment, as a specific example of the "plurality of images of the smart phone 300", "icon images displayed on a display screen of the smart phone 300" will be described as an example. Here, the "icon image" indicates an image which comprehensively represents content of a program or a device by using a drawing, a picture, text, a symbol, or the like. The "icon image" of the present embodiment indicates an image for activating an application which is installed in the smart phone 300. In addition, the "icon image" may include an image drawn by an application (so-called widget or gadget) which is installed in the smart phone 300, an image for activating data (various files) stored in the smart phone 300, an image indicating the presence of a device included in the smart phone 300, or the like. In other words, it can be said that the icon image is a symbol abstracted from an application (program), data, or a device.

Figure 3:
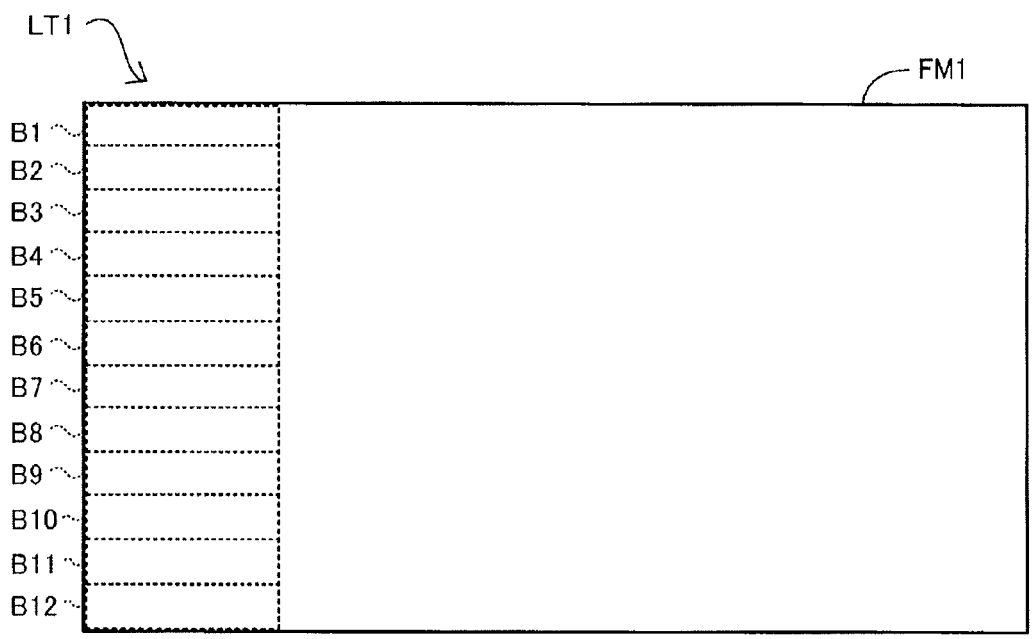
FIG. 3 is a diagram illustrating an example of a frame stored in frame information.

FIG. 3 is a diagram illustrating an example of a frame stored in the frame information 122. A frame FM1 illustrated in FIG. 3 has a configuration in which an image list LT1 is disposed inside a rectangular region (hereinafter, also referred to as a "region of the frame FM1"). The region of the frame FM1 preferably has the same aspect ratio as that of a display element (a right LCD 241 and a left LCD 242 in FIG. 2) of the head mounted display 100.

The image list LT1 is a region in which icon images are disposed in practice in a rearrangement process (FIG. 4) described later. In the example of FIG. 3, the image list LT1 is disposed over the entire left end of the region of the frame FM1. In addition, the image list LT1 may be disposed at any location of the region of the frame FM1. In this case, when a list image generated by using the frame FM1 is displayed on the head mounted display 100, the image list LT1 is preferably disposed at positions (for example, in regions close to four sides) avoiding a central part of the frame FM1. Specifically, for example, the image list LT1 may be disposed at a part of the left end of the frame FM1, may be disposed at a part or an entire of the right end of the region of the frame FM1, may be disposed at a part of or the entire upper end of the region of the frame FM1, and may be disposed at a part of or the entire lower end of the region of the frame FM1.

The image list LT1 includes a plurality of (twelve frames in the illustrated example) rectangular image frames B1 to B12. The image frames B1 to B12 are disposed so that long sides of the rectangular shapes are adjacent to each other in the image list LT1. The image frames B1 to B12 are regions in which icon images of the smart phone 300 are disposed in a rearrangement process (FIG. 4) described later.

The correspondence relationship 124 of FIG. 2 is a storage portion in which an icon image of the smart phone 300 is stored in correlation with at least one of positional information (described later in detail) for identifying a position of the icon image in the smart phone 300 and a link destination information (described later in detail) for identifying a link destination of the icon image in the smart phone 300. Storing a correspondence in the correspondence relationship 124 is performed when the generation unit 142 generates a list image in the rearrangement process (FIG. 4) described later.

The power supply 130 supplies power to the respective units of the head mounted display 100. For example, a secondary battery may be used as the power supply 130. The wireless communication unit 132 performs wireless communication with external apparatuses in accordance with a predetermined wireless communication standard (for example, infrared rays, near field communication exemplified in Bluetooth (registered trademark), or a wireless LAN exemplified in IEEE 802.11). External apparatuses indicate apparatuses other than the head mounted display 100, and include not only the smart phone 300 illustrated in FIG. 1, but also a tablet, a personal computer, a gaming terminal, an audio video (AV) terminal, a home electric appliance, and the like. The GPS module 134 receives a signal from a GPS satellite, and detects a present position of a user of the head mounted display 100 so as to generate present position information indicating the present position of the user. The present position information may be implemented by coordinates indicating, for example, latitude and longitude.

The CPU 140 reads and executes the computer programs stored in the storage unit 120 so as to function as a generation unit 142, a notification unit 144, an operating system (OS) 150, an image processing unit 160, a sound processing unit 170, and a display control unit 190.

Figure 4:
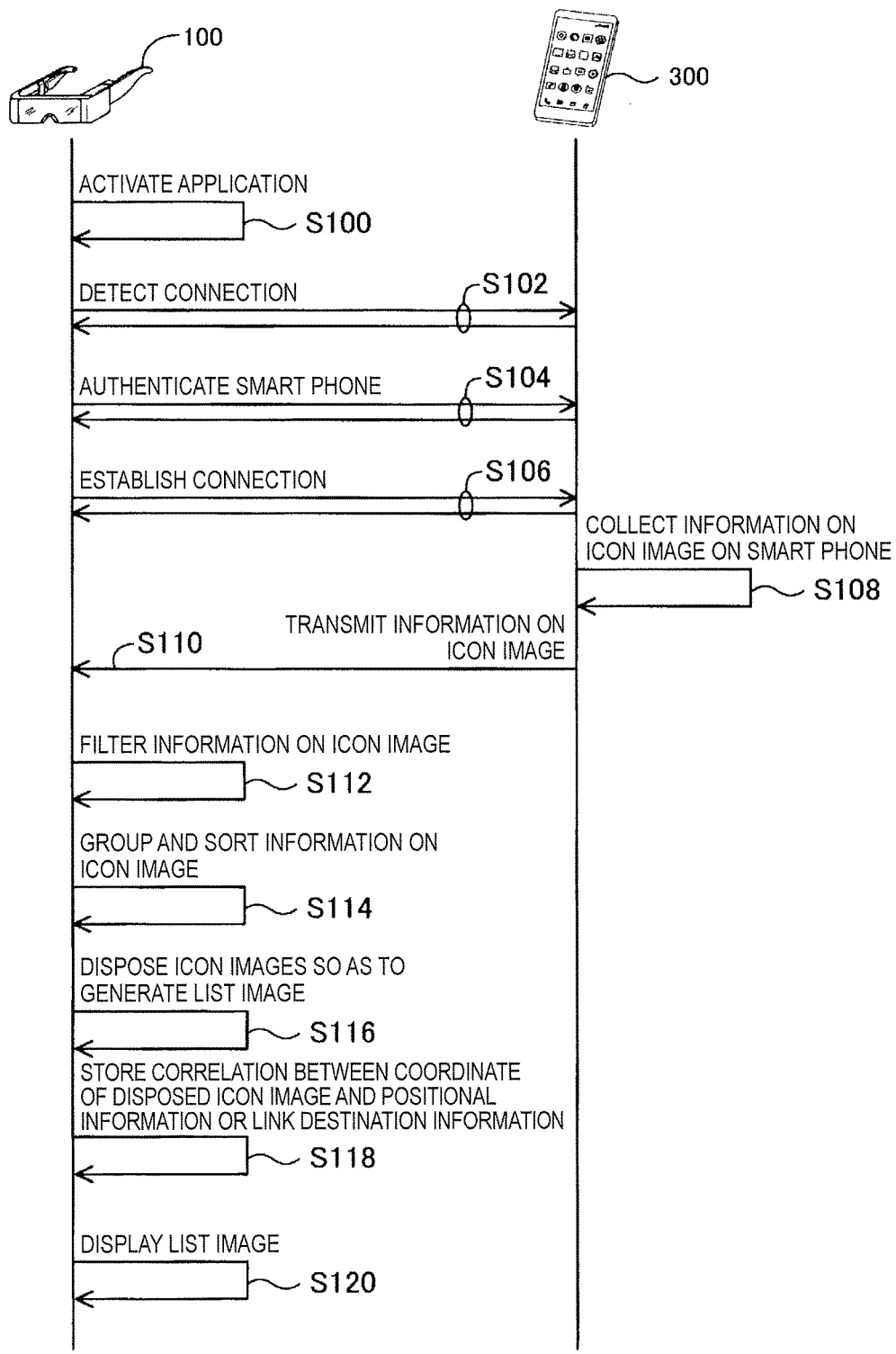
FIG. 4 is a sequence diagram illustrating a procedure of a rearrangement process.
Figure 7:
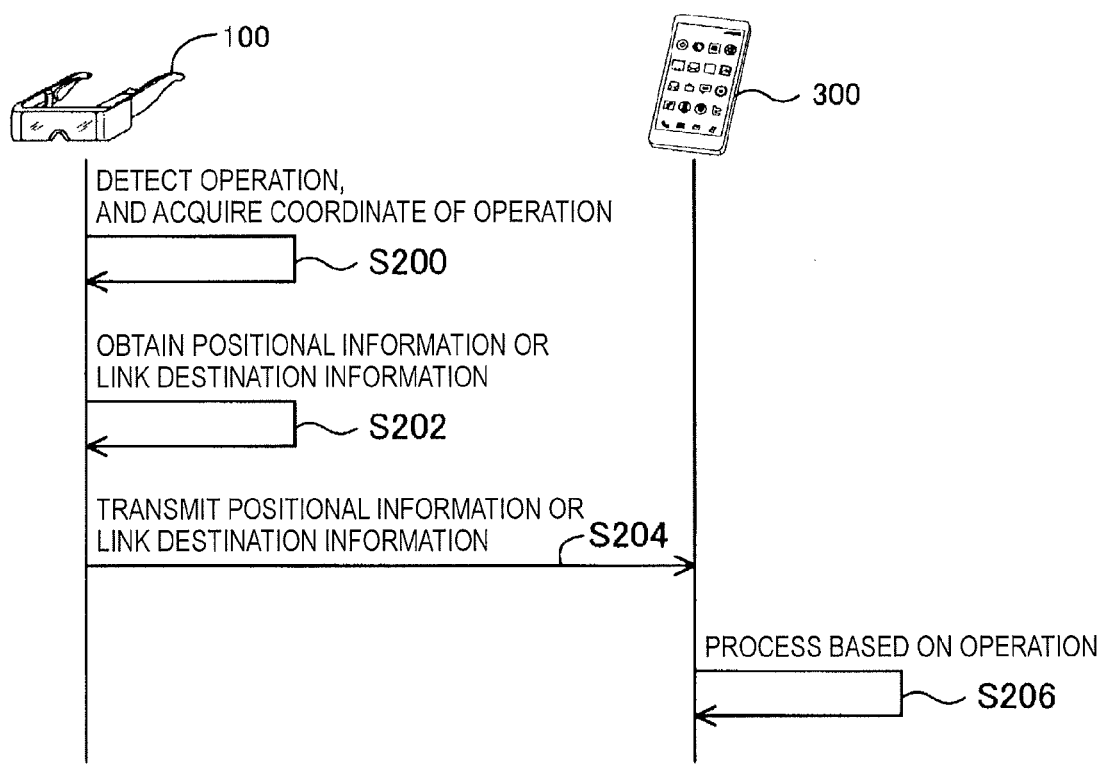
FIG. 7 is a sequence diagram illustrating a procedure of a notification process.

The generation unit 142 generates a list image by changing an arrangement of the icon image acquired from the smart phone 300 in the rearrangement process (FIG. 4). The notification unit 144 notifies the smart phone 300 of at least one of positional information or link destination information of an operated icon image when the icon image is operated from a list image in a notification process (FIG. 7).

The image processing unit 160 generates signals on the basis of a video signal which is input from the generation unit 142, the interface 180, the wireless communication unit 132, or the like via the OS 150. The image processing unit 160 supplies the generated signals to the image display unit 20 via the connection unit 40, so as to control display in the image display unit 20. The signals supplied to the image display unit 20 are different in cases of an analog format and a digital format.

For example, in a case of a digital format, a video signal is input in which a digital R signal, a digital G signal, a digital B signal, and a clock signal PCLK are synchronized with each other. The image processing unit 160 may perform, on image data Data formed by the digital R signal, the digital G signal, and the digital B signal, image processes including a well-known resolution conversion process, various color tone correction processes such as adjustment of luminance and color saturation, a keystone correction process, and the like, as necessary. Then, the image processing unit 160 transmits the clock signal PCLK and the image data Data via the transmission units 51 and 52.

In a case of an analog format, a video signal is input in which an analog R signal, an analog G signal, an analog B signal, a vertical synchronization signal VSync, and a horizontal synchronization signal HSync are synchronized with each other. The image processing unit 160 separates the vertical synchronization signal VSync and the horizontal synchronization signal HSync from the input signal, and generates a clock signal PCLK by using a PLL circuit (not illustrated) in accordance with cycles of the signals. In addition, the image processing unit 160 converts the analog R signal, the analog G signal, and the analog B signal into digital signals by using an A/D conversion circuit or the like. The image processing unit 160 performs well-know image processes on image data Data formed by converted digital R signal, digital G signal, and digital B signal, as necessary, and then transmits the clock signal PCLK, the image data Data, the vertical synchronization signal VSync, and the horizontal synchronization signal HSync via the transmission units 51 and 52. Further, hereinafter, image data Data which is transmitted via the transmission unit 51 is referred to as "right eye image data Data1", and image data Data which is transmitted via the transmission unit 52 is referred to as "left eye image data Data2".

The display control unit 190 generates control signals for control of a right display driving unit 22 and a left display driving unit 24 included in the image display unit 20. The control signals are signals for individually causing a right LCD control portion 211 to turn on and off driving of a right LCD 241, a right backlight control portion 201 to turn on and off driving of a right backlight 221, a left LCD control portion 212 to turn on and off driving of a left LCD 242, and a left backlight control portion 202 to turn on and off driving of a left backlight 222. The display control unit 190 controls each of the right display driving unit 22 and the left display driving unit 24 to generate and emit image light. The display control unit 190 transmits the generated control signals via the transmission units 51 and 52.

The sound processing unit 170 acquires an audio signal included in the content so as to amplify the acquired audio signal, and supplies the amplified audio signal to a speaker (not illustrated) of a right earphone 32 and a speaker (not illustrated) of a left earphone 34.

The interface 180 performs wired communication with external apparatuses in accordance with predetermined wired communication standards (for example, universal serial bus (USB), High Definition Multimedia Interface (HDMI, registered trademark), Digital Visual Interface (DVI), Video Graphic Array (VGA), Composite, RS-232C (Recommended Standard 232), and a wired LAN exemplified in IEEE 802.3). The external apparatuses indicate apparatuses other than the head mounted display 100, and include not only the smart phone 300 illustrated in FIG. 1 but also a tablet, a personal computer, a gaming terminal, an AV terminal, a home electric appliance, and the like.

A-2-2. Configuration of Image Display Unit

The image display unit 20 is a mounting body which is mounted on the head of the user, and has a glasses shape in the present embodiment. The image display unit 20 includes the right display driving unit 22, the left display driving unit 24, a right optical image display unit 26 (FIG. 1), a left optical image display unit 28 (FIG. 1), and a nine-axis sensor 66.

The right display driving unit 22 and the left display driving unit 24 are disposed at locations opposing the head of the user when the user wears the image display unit 20. In the present embodiment, the right display driving unit 22 and the left display driving unit 24 generate image light representing an image by using a liquid crystal display (hereinafter, referred to as an "LCD") or a projection optical system, and emits the image light. The right display driving unit 22 includes a reception portion (Rx) 53, the right backlight (BL) control portion 201 and the right backlight (BL) 221 which function as a light source, the right LCD control portion 211 and the right LCD 241 which function as a display element, and a right projection optical system 251.

The reception portion 53 receives data which is transmitted from the transmission unit 51. The right backlight control portion 201 drives the right backlight 221 on the basis of an input control signal. The right backlight 221 is a light emitting body such as an LED or an electroluminescent element (EL). The right LCD control portion 211 drives the right LCD 241 on the basis of the clock signal PCLK, the right eye image data Data1, the vertical synchronization signal VSync, and the horizontal synchronization signal HSync, which are input. The right LCD 241 is a transmissive liquid crystal panel in which a plurality of pixels are arranged in a matrix. The right LCD 241 drives liquid crystal at each position of the pixels which are arranged in matrix, so as to change transmittance of light which is transmitted through the right LCD 241, thereby modulating illumination light which is applied from the right backlight 221 into effective image light representing an image. The right projection optical system 251 is constituted by a collimator lens which converts image light emitted from the right LCD 241 into parallel beams of light flux.

The left display driving unit 24 has substantially the same configuration as that of the right display driving unit 22, and operates in the same manner as the right display driving unit 22. In other words, the left display driving unit 24 includes a reception portion (Rx) 54, the left backlight (BL) control portion 202 and the left backlight (BL) 222 which function as a light source, the left LCD control portion 212 and the left LCD 242 which function as a display element, and a left projection optical system 252. Detailed description thereof will be omitted. In addition, in the present embodiment, the backlight type is employed in the present embodiment, but there may be a configuration in which image light is emitted using a front light type or a reflective type.

The right optical image display unit 26 and the left optical image display unit 28 are disposed so as to be located in front of the eyes of the user when the user wears the image display unit 20 (refer to FIG. 1). The right optical image display unit 26 includes a right light guide plate 261 and a dimming plate (not illustrated). The right light guide plate 261 is made of a light-transmitting resin material or the like. The right light guide plate 261 guides image light output from the right display driving unit 22 to the right eye RE of the user while reflecting the light along a light path. The right light guide plate 261 may use a diffraction grating, and may use a transflective film. The dimming plate is a thin plate-shaped optical element, and is disposed so as to cover a surface side of the image display unit 20. The dimming plate protects the right light guide plate 261 so as to prevent the right light guide plate 261 from being damaged, polluted, or the like. In addition, light transmittance of the dimming plate is adjusted so as to adjust an amount of external light entering the eyes of the user, thereby controlling an extent of visually recognizing a virtual image. Further, the dimming plate may be omitted.

The left optical image display unit 28 has the substantially same configuration as that of the right optical image display unit 26, and operates in the same manner as the right optical image display unit 26. In other words, the left optical image display unit 28 includes a left light guide plate 262 and a dimming plate (not illustrated), and guides image light output from the left display driving unit 24 to the left eye LE of the user. Detailed description thereof will be omitted.

As mentioned above, the image light which is guided to both eyes of the user of the head mounted display 100 forms an image on the retinas of the user, and thus the user can visually recognize a virtual image. In addition, in the present specification, "displaying an image on the head mounted display 100" also includes allowing a user of the head mounted display 100 to visually recognize a virtual image.

The nine-axis sensor 66 is a motion sensor which detects acceleration (in three axes), angular velocity (in three axes), and geomagnetism (in three axes). The nine-axis sensor 66 is provided in the image display unit 20, and thus functions as a motion detection unit which detects a motion of the head of the user of the head mounted display 100 when the image display unit 20 is mounted on the head of the user. Here, the motion of the head includes velocity, acceleration, angular velocity, a direction, and changing in a direction.

A-3. Rearrangement Process

FIG. 4 is a sequence diagram illustrating a procedure of a rearrangement process. The rearrangement process is a process of generating a list image in which an arrangement of icon images displayed on a display screen of the smart phone 300 is set to an image display mode suitable for the head mounted display 100, and displaying the generated list image on the head mounted display 100. The rearrangement process is mainly performed by the generation unit 142.

In step S100, an application for performing the rearrangement process is activated. The activation of the application in step S100 may be triggered by the input information acquisition unit 110 detecting an activation operation performed by the user, and may be triggered by detecting an activation command from another application. Due to the activation of the application in step S100, functions of the generation unit 142 and the notification unit 144 are implemented by the CPU 140.

In step S102, the wireless communication unit 132 or the interface 180 detects connection of the smart phone 300. In addition, hereinafter, as an example, description will be made of a case where the head mounted display 100 and the smart phone 300 perform communication by using a wireless LAN conforming to IEEE 802.11. In step S104, the generation unit 142 performs authentication of the smart phone 300 which is connected thereto via the wireless communication unit 132. The authentication may be performed by using various authentication techniques. For example, the generation unit 142 may authenticate the smart phone 300 by using a media access control (MAC) address of the smart phone 300, and may authenticate the smart phone 300 by using a user name and a password. Further, the generation unit 142 may authenticate the smart phone 300 by using a digital certificate which is issued by an authentication station, and may authenticate the smart phone 300 by recognizing a physical feature (a face, a fingerprint, or a voiceprint) of a user. After the authentication in step S104 is successful, the generation unit 142 establishes connection to the smart phone 300 in step S106.

In step S108, the smart phone 300 collects information on an icon image which is currently displayed on a display screen of the smart phone 300.

Figure 5:
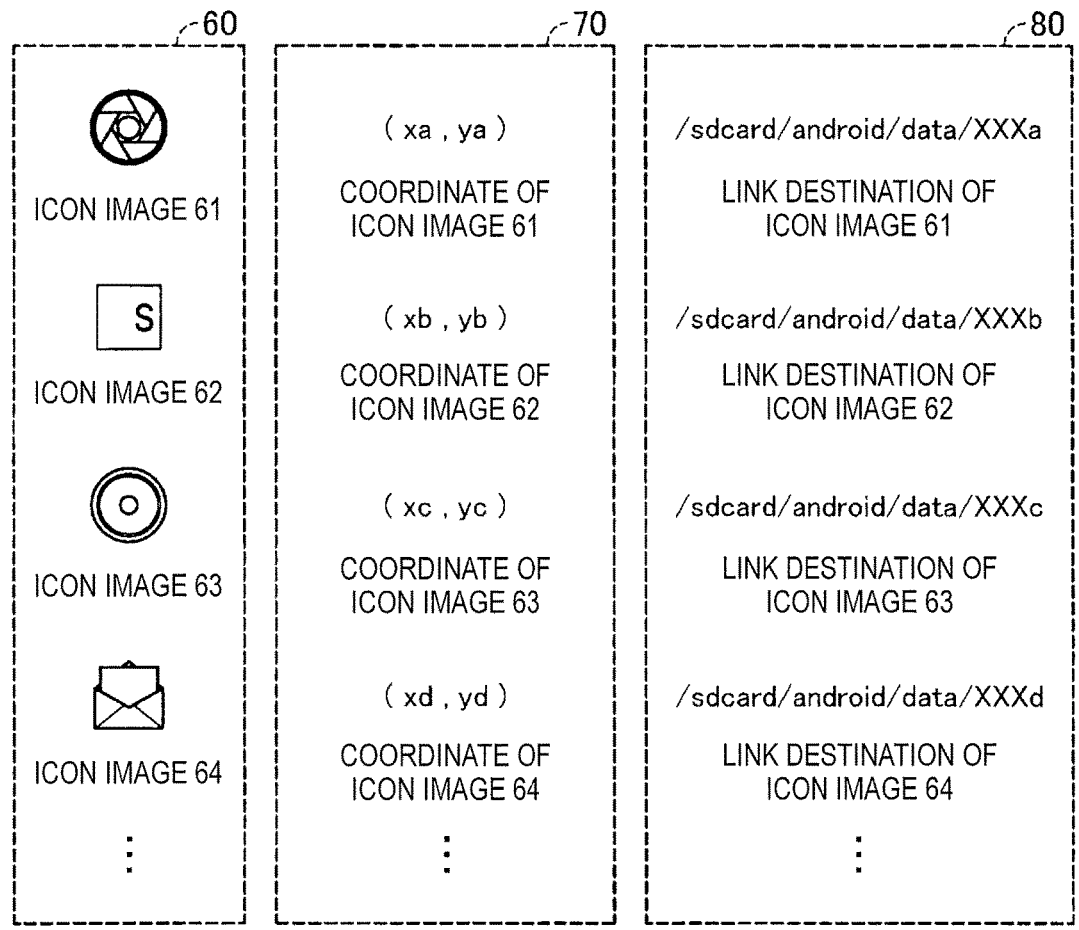
FIG. 5 is a diagram illustrating information on a icon image.

FIG. 5 is a diagram illustrating the information on an icon image. The information on an icon image collected by the smart phone 300 in step S108 of FIG. 4 includes icon images 60, coordinates 70 of icon images, and link destinations 80 of icon images.

The icon images 60 are a set of icon images which are currently displayed on a so-called "standby screen" among display screens of the smart phone 300. In an example of FIG. 5, the icon images 60 include an icon image 61 for activating an application of a camera, icon image 62 for activating an application of an SNS, icon image 63 for activating an application of a speaker, and icon image 64 for activating an application of a mail service.

The coordinates 70 of icon images are a set of coordinates for identifying positions where the icon images 60 (in the illustrated example, the icon images 61 to 64) are disposed in the standby screen of the smart phone 300. The coordinates 70 of icon images may be defined as a movement amount (x,y) of a central position of an icon image relative to an origin when a predetermined point (for example, the upper left end) of the display screen of the smart phone 300 is set to the origin (0,0). The coordinates 70 of icon images function as "positional information". In the example of FIG. 5, the coordinates 70 of icon images include a coordinate (xa,ya) of the icon image 61, a coordinate (xb,yb) of the icon image 62, a coordinate (xc,yc) of the icon image 63, and a coordinate (xd,yd) of the icon image 64.

The link destinations 80 of icon images are a set of link destinations (in other words, file paths of execution files) of execution files of applications indicated by the icon images 60 (in the illustrated example, the icon images 61 to 64) which are currently displayed on the smart phone 300. In addition, in a case where an icon image is an image for activating data stored in the smart phone 300, a link destination of the icon image is a link destination (in other words, a file path of the data) of the data. The link destinations 80 of icon images function as "link destination information". In the example of FIG. 5, the link destinations 80 of icon images include "/sdcard/android/data/XXXa" which is a link destination of the icon image 61, "/sdcard/android/data/XXXb" which is a link destination of the icon image 62, "/sdcard/android/data/XXXc" which is a link destination of the icon image 63, and "/sdcard/android/data/XXXd" which is a link destination of the icon image 64.

As mentioned above, in step S108 of FIG. 4, the smart phone 300 collects, as the "information on an icon image", the icon images 60, the coordinates 70 of icon images, and the link destinations 80 of icon images formed by an n sets of icon images, coordinates of icon images, and link destinations of icon images, in relation to all (for example, n) icon images which are currently displayed on the display screen of the smart phone 300. In addition, either the coordinates 70 of icon images or the link destinations 80 of icon images may be omitted. Then, in step S110, the smart phone 300 transmits the information on an icon image collected in step S108, to the head mounted display 100.

In step S112, the generation unit 142 acquires the information on an icon image via the wireless communication unit 132. At this time, the generation unit 142 and the wireless communication unit 132 function as an "acquisition unit". After the information on an icon image is acquired, the generation unit 142 filters the information on an icon image in step S112. For example, the generation unit 142 may filter the information on an icon image by using at least one of the following conditions a1 to a3.

(a1) The generation unit 142 discards duplicate information in the information on an icon image. Specifically, in a case where a plurality of pieces of information in which content of the link destinations 80 of icon images is the same and content of the coordinates 70 of icon images is different are included in the information on an icon image, the generation unit 142 regards that "there are a plurality of pieces of (duplicate) icon images referring to the same link destination", and discards one of the information pieces. Accordingly, the generation unit 142 can prevent duplicate icon images which refer to the same link destination from being included in a list image.

(a2) The generation unit 142 discards some information according to an application indicated by an icon image. Specifically, the generation unit 142 specifies an application indicated by each of the icon images 60 (61 to 6n) from the content of the link destinations 80 (81 to 8n) of icon images. In a case where the specified application is a predetermined application, the generation unit 142 discards information on a corresponding icon image. Accordingly, the generation unit 142 can prevent an icon image for a predetermined application from being included in a list image. Here, when the "predetermined application" is, for example, an application which cannot be executed in the head mounted display 100, the generation unit 142 can prevent an icon image of the application which cannot be executed in the head mounted display 100 from being included in a list image.

(a3) The generation unit 142 discards some information according to the frequency in use of an application (or data) indicated by an icon image. In this case, the information on an icon image which is collected and transmitted by the smart phone 300 further includes the frequency of use for an application (or data) indicated by each of the icon images 60 (61 to 6n). In a case where the frequency in use is equal to or less than a predetermined frequency in use, the generation unit 142 discards information on a corresponding icon image. Accordingly, the generation unit 142 can prevent an icon image of a less frequently used application (or data) in the smart phone 300 from being included in a list image.

In addition, a filtering condition in step S112 may be arbitrarily set by a user. Then, since a user can visually recognize a list image which is filtered so that the user's favorite icon images remain, it is possible to improve convenience for the user.

In step S114, the generation unit 142 groups and sorts the information on an icon image. For example, the generation unit 142 may group and sort the information on an icon image by using at least one of the following conditions b1 to b3.

(b1) The generation unit 142 groups and sorts the information on an icon image depending on the kind of icon image. Here, the kind of icon image indicates whether each of the icon images 60 (61 to 6n) is (i) an image for activating an application installed in the smart phone 300, (ii) an image drawn by an application (so-called widget or gadget) installed in the smart phone 300, or (iii) an image for activating data stored in the smart phone 300 (refer to step S108).

(b2) The generation unit 142 groups and sorts the information on an icon image depending on the name or the kind of application (data) indicated by an icon image. In addition, the name of an application (or data) can be acquired from the content of the link destinations 80 of icon images.

(b3) The generation unit 142 groups and sorts the information on an icon image according to the frequency of use for an application (or data) indicated by an icon image. In addition, a method of acquiring the frequency of use for an application (or data) is the same as in the above condition a3.

As mentioned above, if the conditions b1 to b3 are used, the generation unit 142 can group or sort the information on an icon image by using various conditions. As a result, it is possible to improve visibility of the individual icon images 60 (61 to 6n) in a list image.

In step S116, the generation unit 142 disposes the icon images 60 in the frame FM1 (FIG. 3) by the information on an icon image after step S114 is completed, so as to generate a list image. Specifically, the generation unit 142 acquires the frame FM1 from the frame information 122, and sequentially disposes the individual icon images 60 (61 to 6n) included in the sorted information on an icon image in the image frames B1 to B12 of the image list LT1 of the acquired frame FM1. The generation unit 142 may perform processings as exemplified in the following c1 to c5 on each of the icon images 60 (61 to 6n) when the icon images 60 are disposed in the image frames B1 to B12. In addition, the processings c1 to c5 may be employed singly, and may be employed together.

(c1) The generation unit 142 changes a shape of an icon image. For example, the generation unit 142 may change a square icon image to a circular image.

(c2) The generation unit 142 changes transmittance of an icon image. For example, the generation unit 142 may increase or decrease transmittance of an icon image. If the transmittance of an icon image is increased, it is possible to prevent a view field of a user from being impeded by the icon image when the user visually recognizes the list image which is displayed as a virtual image.

(c3) The generation unit 142 performs a color conversion process on an icon image. For example, the image display unit 20 is provided with a camera which captures an image of external scenery in a visual line direction of a user and acquires the external scenery image. In addition, the generation unit 142 performs a color conversion process for strengthening a complementary color of the external scenery image, on an icon image. Accordingly, the generation unit 142 can make an icon image more visible than the external scenery.

(c4) The generation unit 142 changes a size of an icon image. For example, the generation unit 142 enlarges or reduces a size of an icon image so as to match a size of each of the image frames B1 to B12.

(c5) The generation unit 142 adds decorations such as text, graphics, and symbols to an icon image. For example, the generation unit 142 may add text for explaining an icon image to the icon image. Accordingly, when a list image displayed as a virtual image is visually recognized, a user easily understands what each icon image is. In addition, for example, the generation unit 142 may add a frame which borders a circumference of an image, to the icon image. Accordingly, the generation unit 142 can make an icon image more visible than the external scenery.

In step S118, the generation unit 142 stores coordinates of the icon images 60 on the frame FM1 in the correspondence relationship 124 in correlation with at least one of positional information or link destination information. The coordinates of the icon images 60 on the frame FM1 may be defined as a movement amount (x,y) of a central position of an icon image relative to an origin when a predetermined point (for example, the upper left end) of the frame FM1 is set to the origin (0,0). The generation unit 142 obtains respective coordinates of the icon images 60 (61 to 6n) on the frame FM1 in the above-described manner. The generation unit 142 stores the obtained coordinates on the frame FM1 and the coordinates 70 (71 to 7n) of corresponding icon images or the link destinations 80 (81 to 8n) of corresponding icon images in the correspondence relationship 124.

In step S120, the generation unit 142 displays the list image on the head mounted display 100. Specifically, the generation unit 142 transmits the list image generated in step S116 to the image processing unit 160. The image processing unit 160 which has received the list image performs the above-described display process. As a result, the image light guided to both eyes of the head mounted display 100 forms an image on the retinas of the user, and thus the user of the head mounted display 100 can visually recognize a virtual image of the list image in a view field. In other words, the head mounted display 100 can display the list image.

Figure 6A:
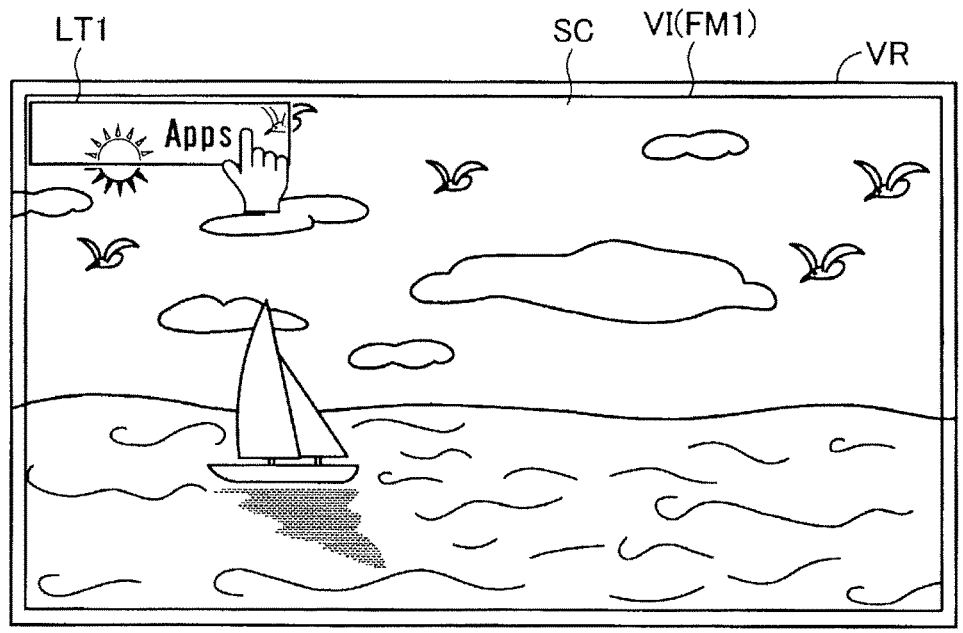
FIGS. 6A and 6B are diagrams illustrating a state in which a list image is displayed on the head mounted display.
Figure 6B:
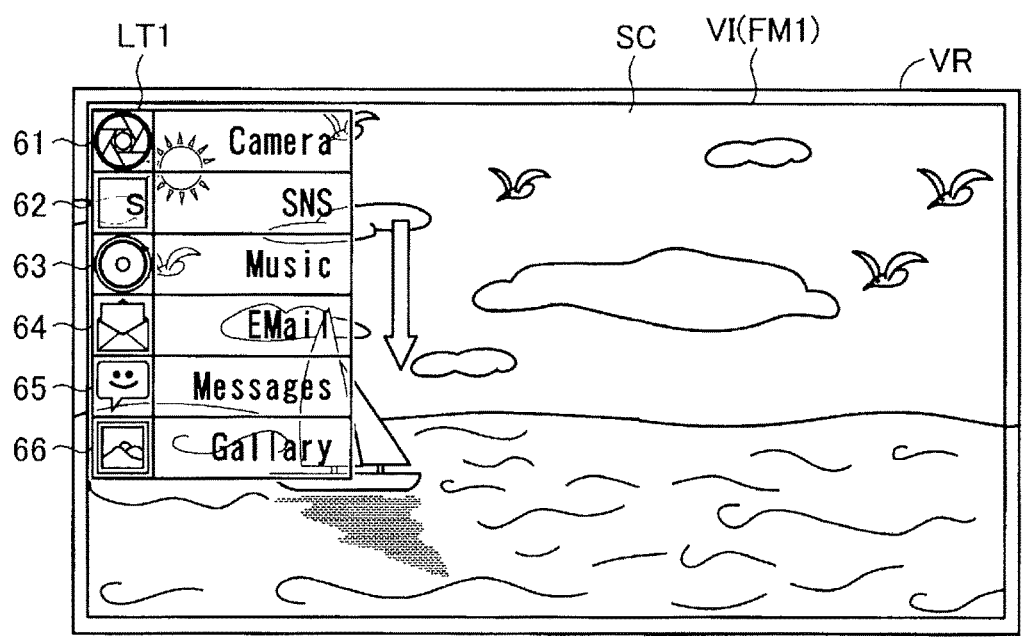

FIGS. 6A and 6B are diagrams illustrating a state in which a list image is displayed on the head mounted display 100. FIG. 6A illustrates the list image in a state in which the image list LT1 is folded. FIG. 6B illustrates the list image in a state in which the image list LT1 is unfolded. As illustrated in FIG. 6A, the image processing unit 160 displays the list image in which the image list LT1 is folded while an operation performed by a user is not detected. In addition, when a predetermined operation (for example, click, double click, drag, on-focus, tap, double tap, or flick) on the folded image list LT1 is acquired by the input information acquisition unit 110, the list image in which the image list LT1 is unfolded is displayed as illustrated in FIG. 6B. In addition, the image processing unit 160 may omit the state of FIG. 6A. In this case, the list image illustrated in FIG. 6B is displayed at all times.

As illustrated in FIGS. 6A and 6B, a user of the head mounted display 100 can visually recognize of a virtual image VI of the list image disposed in the frame FM1 in a view field VR. At this time, the user can visually recognize external scenery SC through the right optical image display unit 26 and the left optical image display unit 28 (FIG. 1). In other words, the user of the head mounted display 100 of the present embodiment can view the virtual image VI and the external scenery SC which is a background of the virtual image VI, in a part of the view field VR where the virtual image VI is displayed. Further, the user can directly view the external scenery SC through the right optical image display unit 26 and the left optical image display unit 28 in a part of the view field VR where the virtual image VI is not displayed.

As mentioned above, according to the rearrangement process of the first embodiment, the image display unit 20 allows a user to visually recognize the list image which is generated by changing an arrangement of the icon images 60 of the smart phone 300 (external apparatus) into an arrangement for the head mounted display 100, as the virtual image VI. The icon images 60 of the smart phone 300 are images which are displayed on a display screen of the smart phone 300. Changing an arrangement of the icon images 60 to an arrangement for the head mounted display 100 indicates, that is, setting a display screen of the smart phone 300 to an image display mode suitable for the head mounted display 100. As a result, the image display unit 20 can display the display screen of the smart phone 300 on the head mounted display 100 by using the image display mode suitable for the head mounted display 100.

In addition, according to the rearrangement process of the first embodiment, the generation unit 142 generates the list image by using the frame FM1 in which the image list LT1 (a region in which the icon images 60 are disposed in practice) is disposed at a position (for example, in regions close to four sides) avoiding the central part of the frame FM1. For this reason, the image display unit 20 can display the list image in which a position of an arrangement of the icon images 60 is changed to a position avoiding the central part of the virtual image VI. Therefore, it is possible to prevent a front side of the eyes of a user from being blocked by the icon images 60.

A-4. Notification Process

FIG. 7 is a sequence diagram illustrating a procedure of a notification process. The notification process is a process of notifying the smart phone 300 of positional information or link destination information of an operated icon image when the icon image is operated from a list image which is displayed on the head mounted display 100. The notification process is mainly performed by the notification unit 144.

In step S200, the input information acquisition unit 110 detects an operation on any icon image in the list image which is displayed on the head mounted display 100, and acquires a coordinate (x,y) of the operated icon image. At this time, the input information acquisition unit 110 functions as an "operation acquisition unit". In step S202, the notification unit 144 receives the coordinate (x,y) from the input information acquisition unit 110, searches for the "coordinates of the icon images 60 on the frame FM1" of the correspondence relationship 124 with the received coordinate as a key, and acquires corresponding positional information (the coordinates 70 of icon images on the smart phone 300) or link destination information (the link destinations 80 of icon images on the smart phone 300).

In step S204, the notification unit 144 transmits the acquired positional information or link destination information to the smart phone 300. In addition, in step S204, the notification unit 144 may notify the smart phone 300 of both the positional information and the link destination information. Further, in step S204, the notification unit 144 may transmit content (for example, click, double click, drag, on-focus, tap, double tap, or flick) of the operation detected in step S200 to the smart phone 300. In step S206, the smart phone 300 specifies the operated icon image of the smart phone 300 from the positional information or the link destination information which is received from the head mounted display 100, and performs a process based on the operation detected in step S200.

As mentioned above, according to the notification process of the first embodiment, in a case where an operation (for example, click, double click, drag, on-focus, tap, double tap, or flick) is performed on an icon image of the list image which is displayed on the head mounted display 100, the notification unit 144 notifies the smart phone 300 (external apparatus) of at least one of the positional information (the coordinates 70 of icon images on the smart phone 300) and the link destination information (the link destinations 80 of icon images on the smart phone 300). The positional information is information for identifying a position of an icon image in the smart phone 300, and thus can be written in a character string by using coordinates or the like and has a small volume of data. Similarly, the link destination information is information for identifying a link destination of an icon image in the smart phone 300, and thus can be written in a character string by using a file path or the like and has a small volume of data. Therefore, according to the head mounted display 100 of the embodiment, it is possible to reduce a data volume of information which is transmitted from the head mounted display 100 to the smart phone 300 and thus to reduce a communication load.

In addition, according to the notification process of the first embodiment, the notification unit 144 can easily perform a notification of positional information or link destination information of an operated icon image by using the correspondence relationship 124 which correlates the icon images 60 with the coordinates 70 (positional information) of icon images or the link destinations 80 (link destination information) of icon images.

A-5. Another Example of Frame

Description will be made of another example of a frame which can be used in the rearrangement process (FIG. 4). The frame information 122 may store various frames described below instead of the frame described in FIG. 3 or along with the frame described in FIG. 3. In a case where a plurality of frames are stored in the frame information 122, a frame used in the rearrangement process may be arbitrarily selected.

Figure 8:
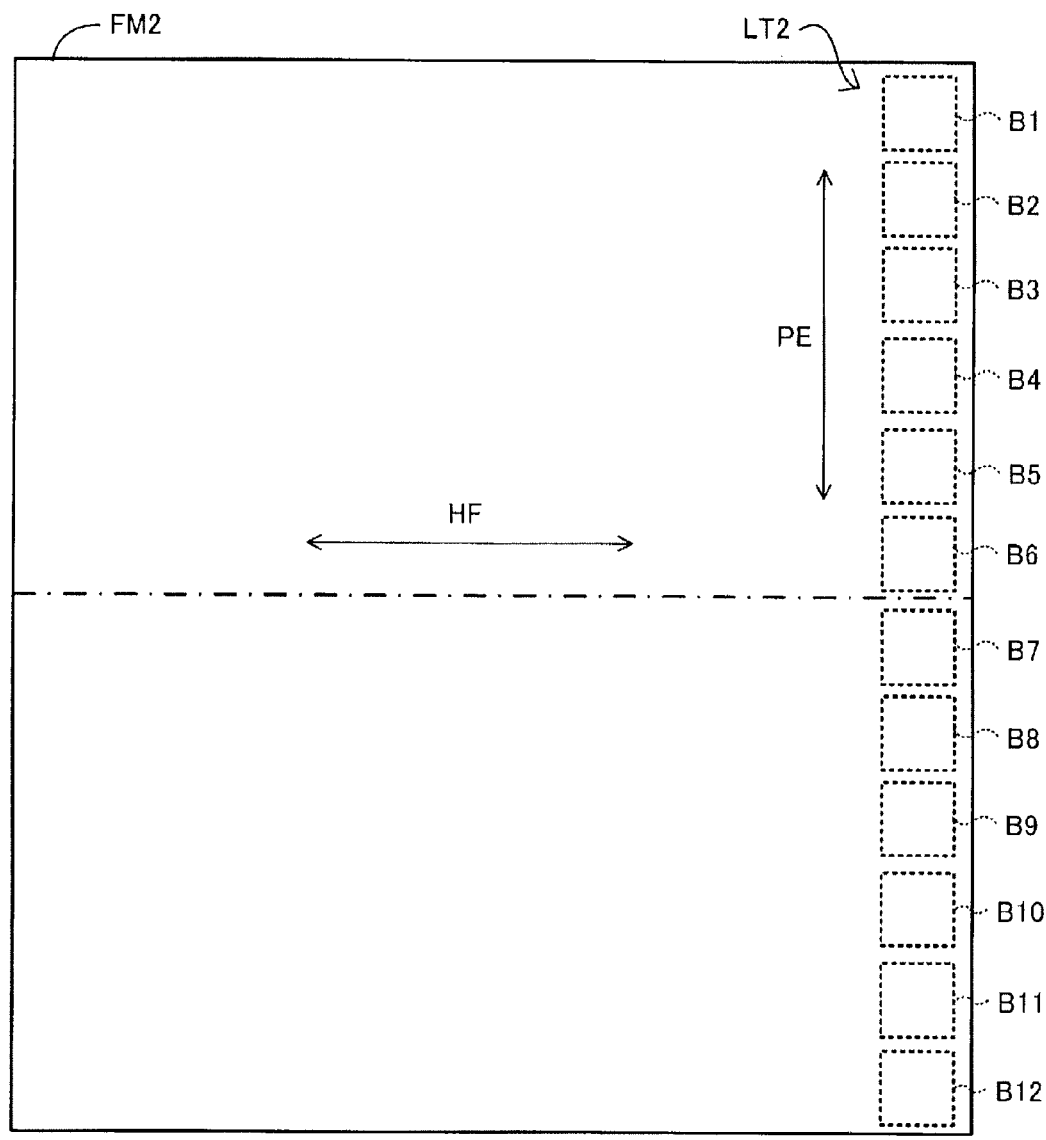
FIG. 8 is a diagram illustrating another example of a frame stored in the frame information.

FIG. 8 is a diagram illustrating another example of a frame stored in the frame information 122. A frame FM2 illustrated in FIG. 8 has a configuration in which an image list LT2 is disposed inside a rectangular region (hereinafter, also referred to as a "region of the frame FM2"). A width ratio of the region of the frame FM2 is the same as a width ratio of the display element of the head mounted display 100. A height ratio of the region of the frame FM2 is larger than a height ratio of the display element of the head mounted display 100. This is aimed at enabling vertical scrolling in a vertical direction PE in a list image displayed on the head mounted display 100. In addition, in FIG. 8, a region of the display element of the head mounted display 100 is indicated by a dot chain line.

The image list LT2 is a region in which icon images are disposed in practice in the rearrangement process (FIG. 4), and, in the example of FIG. 8, the image list LT2 is disposed over the entire right end of the region of the frame FM2. The image list LT2 may be disposed at any location of the region of the frame FM2. In this case, when a list image generated by using the frame FM2 is displayed on the head mounted display 100, the image list LT2 is preferably disposed at positions (for example, in regions close to four sides) avoiding a central part of the frame FM2. Specifically, for example, the image list LT2 may be disposed at a part of the right end of the frame FM2, may be disposed at a part or an entire of the left end of the region of the frame FM2, may be disposed at a part of or the entire upper end of the region of the frame FM2, and may be disposed at a part of or the entire lower end of the region of the frame FM2.

The image list LT2 includes a plurality of (twelve frames in the illustrated example) square image frames B1 to B12. The image frames E1 to B12 are disposed so as to be adjacent to each other in the image list LT2. The image frames B1 to B12 are regions in which the icon images 60 of the smart phone 300 are disposed in the rearrangement process (FIG. 4). In addition, in a case where the image list LT2 is disposed at the upper and lower ends of the frame FM2, a width ratio of the region of the frame FM2 is made larger than a width ratio of the display element, and a height ratio of the region of the frame FM2 is made identical to a height ratio of the display element. Then, horizontal scrolling in a horizontal direction HF can be performed in a list image displayed on the head mounted display 100.

Figure 9A:
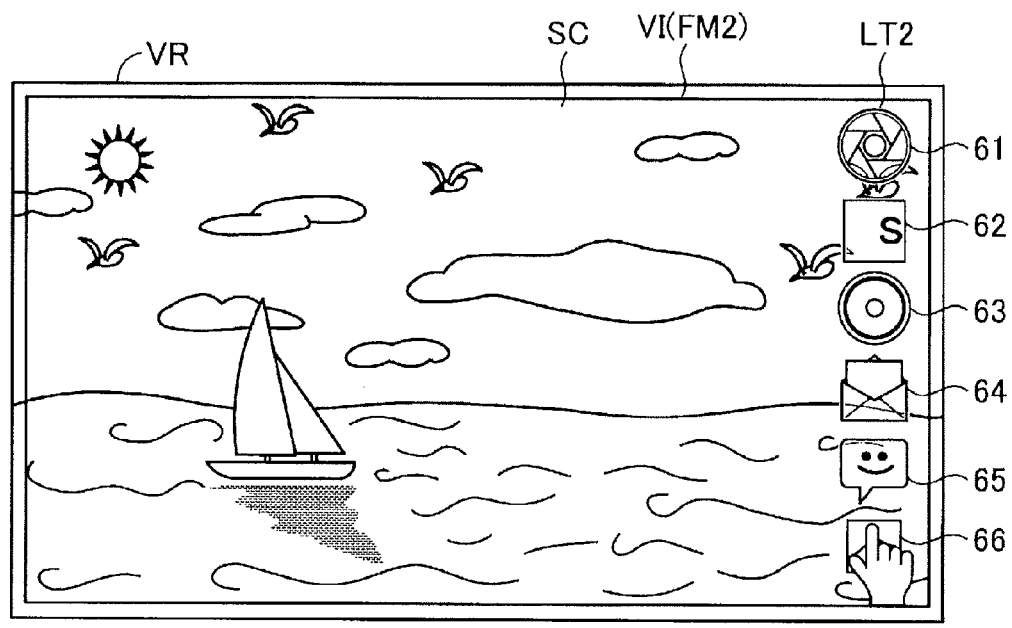
FIGS. 9A and 9B are diagrams illustrating a state in which a list image which generated by using a frame is displayed on the head mounted display.
Figure 9B:
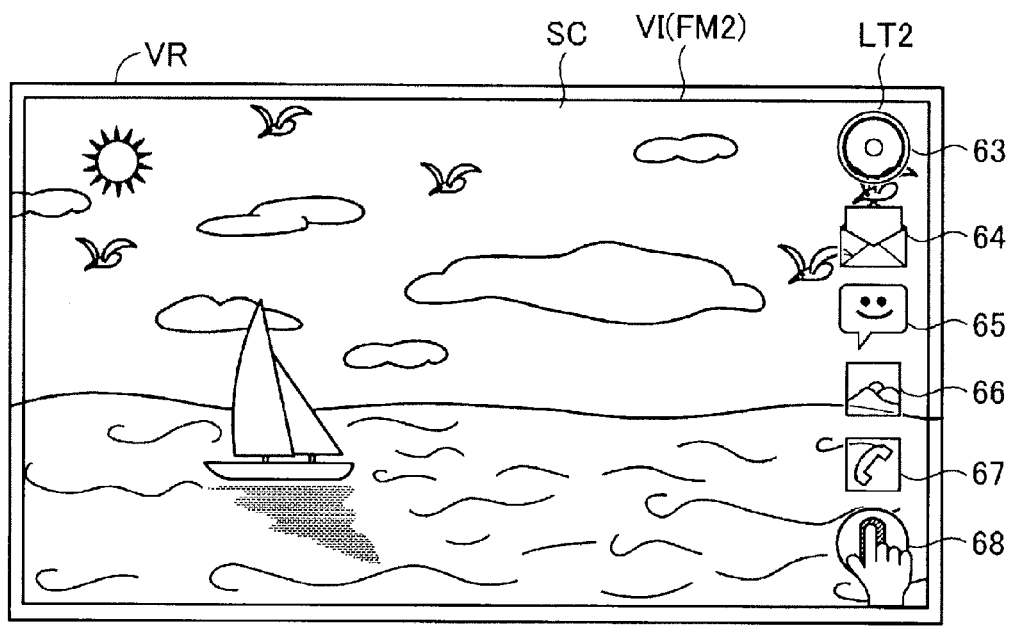

FIGS. 9A and 9B are diagrams illustrating a state in which a list image which is generated by using the frame FM2 is displayed on the head mounted display 100. FIG. 9A illustrates the list image before the image list LT2 is scrolled. FIG. 9B illustrates the list image after the image list LT2 is scrolled.

As mentioned above, even in a case where the list image is generated by using the frame FM2 described in FIG. 8, the same effect as the effect in the case of using the frame FM1 of FIG. 3 can be achieved.

Figure 10:
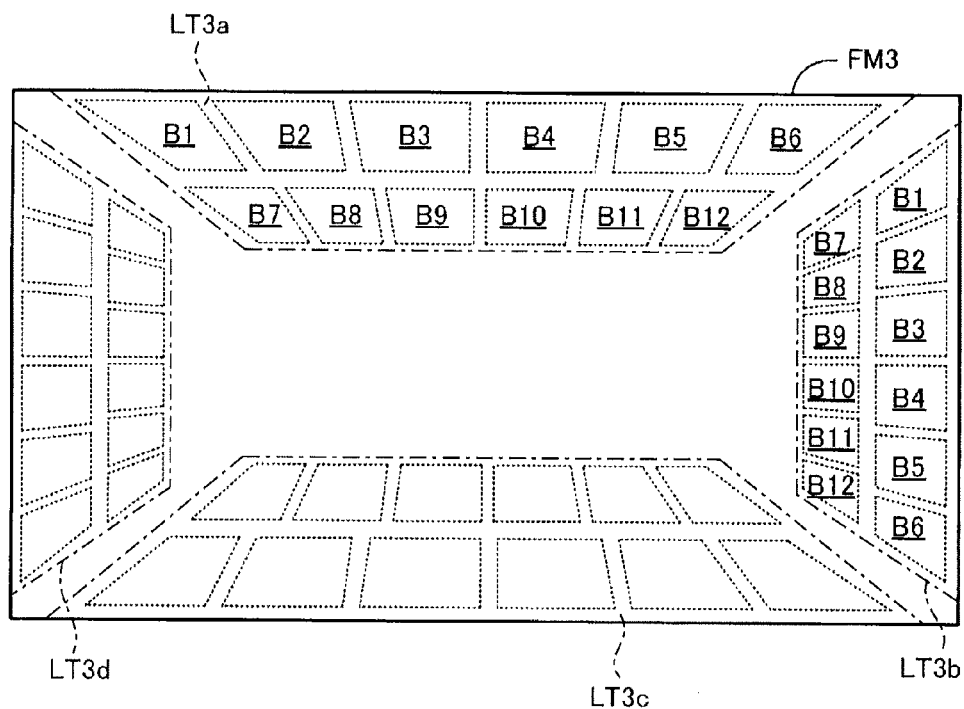
FIG. 10 is a diagram illustrating still another example of a frame stored in the frame information.

FIG. 10 is a diagram illustrating still another example of a frame stored in the frame information 122. A frame FM3 illustrated in FIG. 10 has a configuration in which four image lists LT3a to LTA3d are disposed inside a rectangular region (hereinafter, also referred to as a "region of the frame FM3"). The region of the frame FM3 preferably has the same aspect ratio as an aspect ratio of the display element of the head mounted display 100.

The four image lists LT3a to LT3d are regions in which icon images are disposed in practice in the rearrangement process (FIG. 4). In an example of FIG. 10, the image list LT3a is disposed in a trapezoidal shape so as to extend from an upper end of the frame FM3 toward the vicinity of a center. Similarly, the image list LT3b is disposed in a trapezoidal shape so as to extend from a right end of the frame FM3 toward the vicinity of the center, the image list LT3c is disposed in a trapezoidal shape so as to extend from a lower end of the frame FM3 toward the vicinity of the center, and the image list LT3d is disposed in a trapezoidal shape so as to extend from a left end of the frame FM3 toward the vicinity of the center.

Each of the image lists LT3a to LT3d includes a plurality of (in the illustrated example, twelve) trapezoidal image frames B1 to B12. The image frames B1 to B12 are disposed in a tile shape so as to be adjacent to each other in the image lists LT3a to LT3d. The image frames B1 to B12 are regions in which the icon images 60 of the smart phone 300 are disposed in the rearrangement process (FIG. 4). For example, in a case where the information on an icon image is divided into a plurality of groups in step S114, the generation unit 142 may perform a process of disposing icon images belonging to a first group in the image list L3a and disposing icon images belonging to a second group in the image list LT3b. When a list image is generated, the generation unit 142 may use all the image lists LT3a to LT3d, and may use some of the lists.

Figure 11:
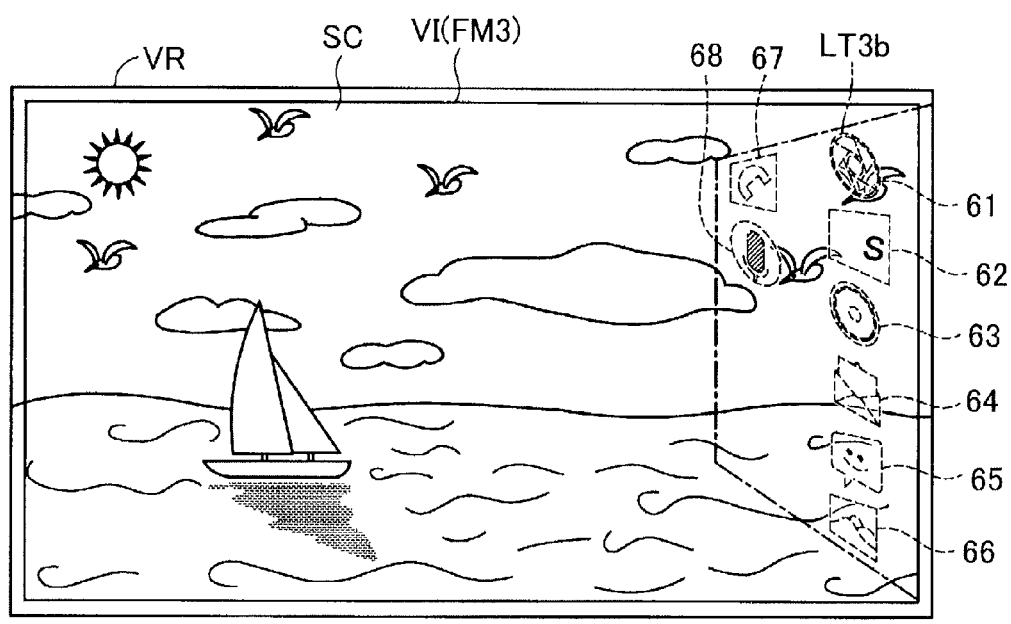
FIG. 11 is a diagram illustrating a state in which a list image which generated by using a frame is displayed on the head mounted display.

FIG. 11 is a diagram illustrating a state in which a list image which is generated by using the frame FM3 is displayed on the head mounted display 100. In an example of FIG. 11, the icon images 60 are arranged by using the image list LT3b.

As mentioned above, even if the list image is generated by using the frame FM3 described in FIG. 10, the same effect as the effect in the case of using the frame FM1 of FIG. 3 can be achieved.

B. Second Embodiment

In a second embodiment of the invention, description will be described of a configuration capable of generating a list image in which icon images of a head mounted display are disposed along with icon images acquired from a smart phone. Hereinafter, only configurations and operations different from those of the first embodiment will be described. In addition, in the drawings, constituent elements which are the same as those of the first embodiment are given the same reference numerals as in the above-described first embodiment, and detailed description will be omitted.

B-1. Configuration of Image Display System

A schematic configuration of an image display system of the second embodiment is the same as that of the first embodiment illustrated in FIG. 1.

B-2. Configuration of Head Mounted Display

Figure 12:
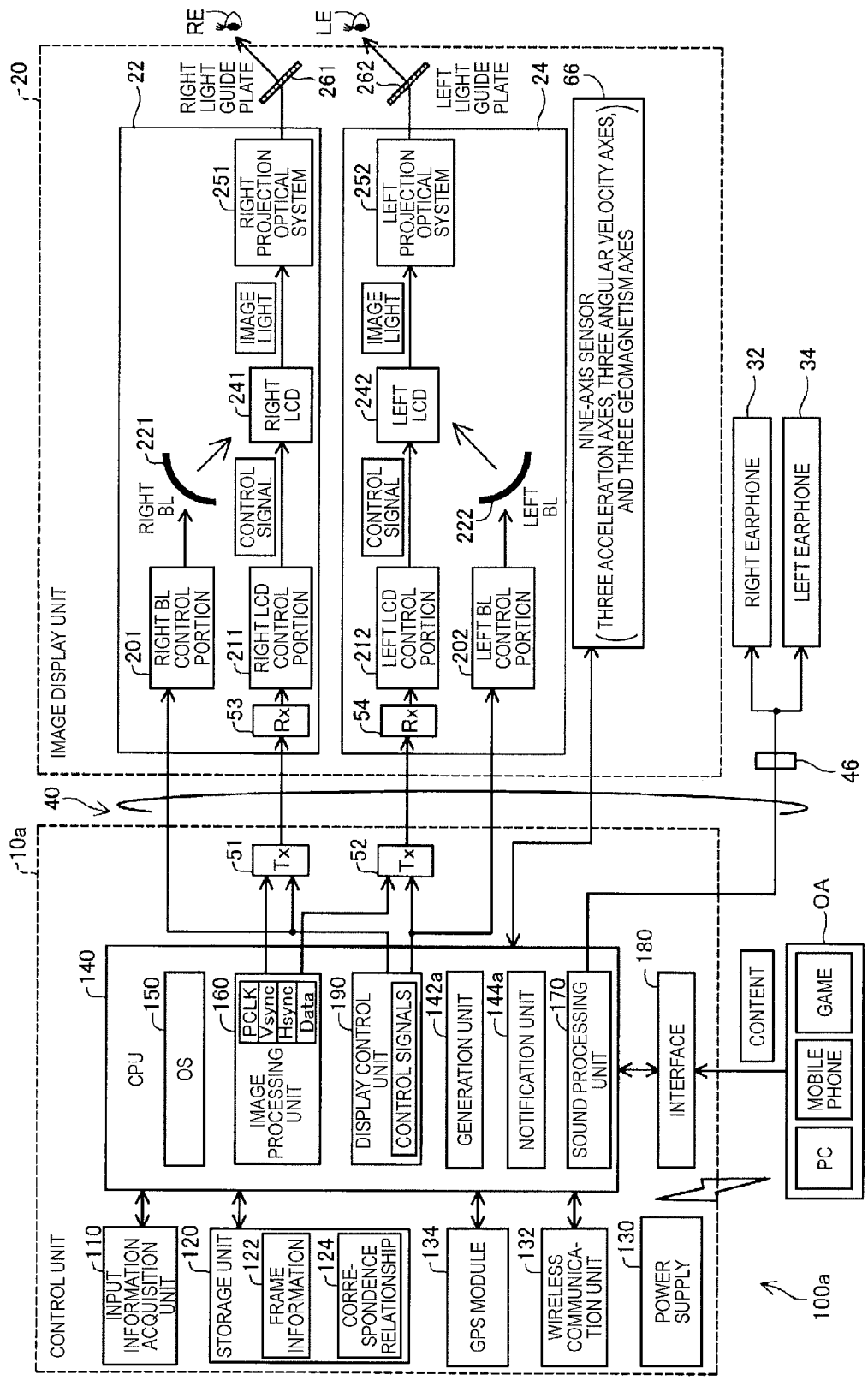
FIG. 12 is a functional block diagram illustrating a configuration of a head mounted display according to a second embodiment.

FIG. 12 is a functional block diagram illustrating a configuration of a head mounted display 100a of the second embodiment. A difference from the first embodiment illustrated in FIG. 2 is that a control unit 10a is provided instead of the control unit 10. The control unit 10a includes a generation unit 142a instead of the generation unit 142, and a notification unit 144a instead of the notification unit 144. In the generation unit 142a, process content of a rearrangement process is different from that of the first embodiment described with reference to FIG. 4. In the notification unit 144a, process content of a notification process is different from that of the first embodiment described with reference to FIG. 7.

B-3. Rearrangement Process

Figure 13:
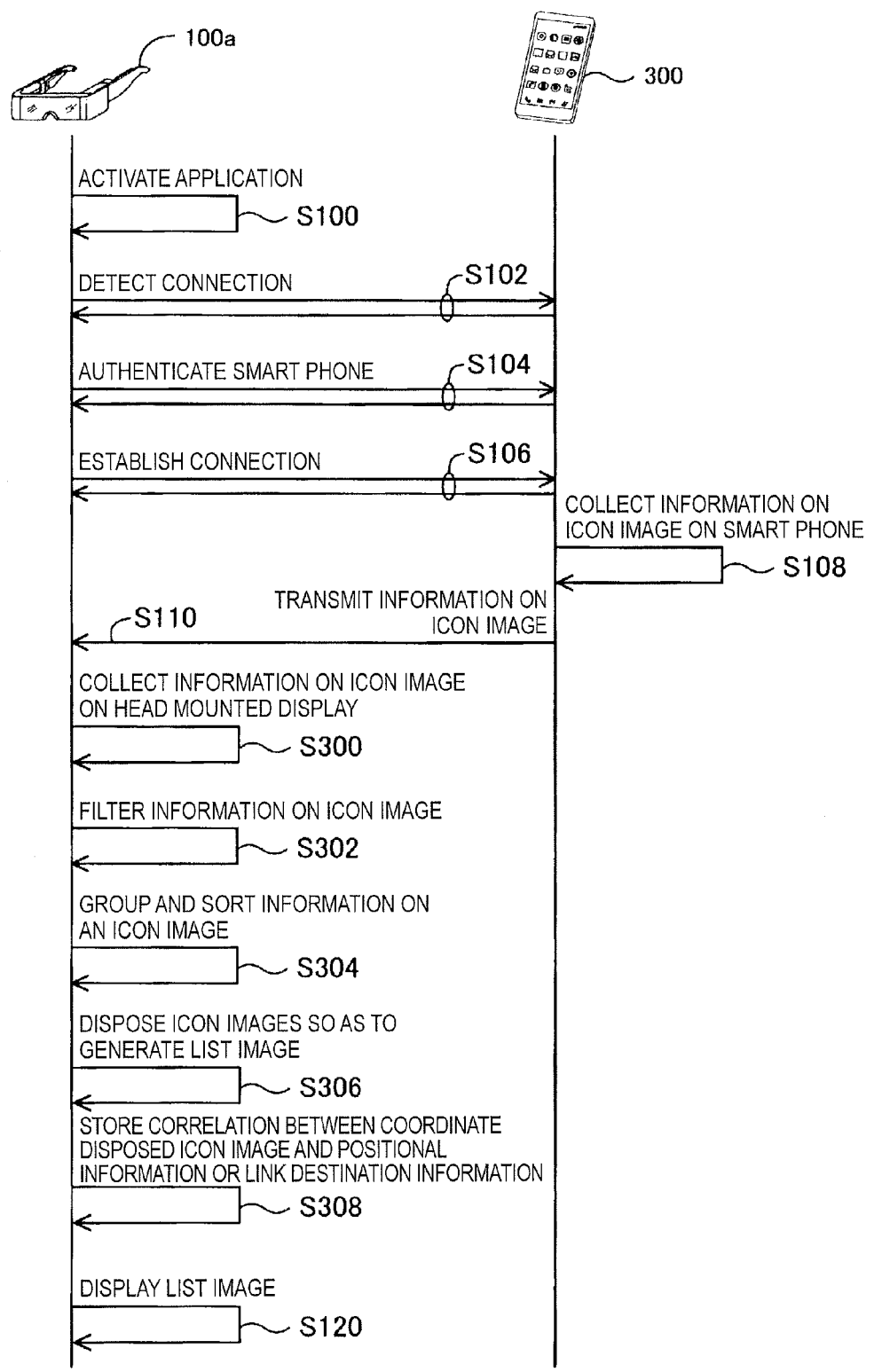
FIG. 13 is a sequence diagram illustrating a procedure of a rearrangement process of the second embodiment.

FIG. 13 is a sequence diagram illustrating a procedure of a rearrangement process of the second embodiment. Only a difference from the first embodiment illustrated in FIG. 4 is that steps S300 to S308 are provided instead of steps S112 to S118, and other process content items are the same as those of the first embodiment.

In step S300, the generation unit 142a collects information on an icon image which is currently displayed on a display screen of the head mounted display 100a. The "icon image" of the second embodiment includes not only an image for activating an application installed in the smart phone 300 described in the first embodiment, but also an image for activating an application installed in the head mounted display 100a. In addition, the "icon image" may include an image drawn by a widget or gadget installed in the head mounted display 100a, or an image for activating data stored in the head mounted display 100a. Details of process content of the generation unit 142a in step S300 are the same as those of the description of step S108 of the first embodiment and the description of FIG. 5. However, the "smart phone 300" is replaced with the "head mounted display 100a".

In step S302, the generation unit 142a filters the information on an icon image of the smart phone 300 and the information on an icon image of the head mounted display 100a. Details thereof are the same as those of step S112 of the first embodiment.

In step S304, the generation unit 142a groups and sorts the information on an icon image of the smart phone 300 and the information on an icon image of the head mounted display 100a. Details thereof are the same as those of step S114 of the first embodiment. In addition, in step S304, the grouping or the sorting is preferably performed by using the following condition b4 along with the conditions b1 to b3 described in step S114.

(b4) The generation unit 142a groups or sorts the information on an icon image depending on an extraction source apparatus (specifically, an icon image of the head mounted display 100a or an icon image of the smart phone 300) of the information on an icon image. As mentioned above, if the condition b4 is used, the generation unit 142a can group or sort the information on an icon image depending on an extraction source apparatus of the information on an icon image. As a result, it is possible to improve visibility of the individual icon images 60 (61 to 6n) in a list image.

In step S306, the generation unit 142a disposes the icon images 60 in the frame FM1 (FIG. 3) by using the information on an icon image after step S304 is completed, so as to generate a list image. Details thereof are the same as those of step S116 of the first embodiment. In addition, in step S306, a processing described in the following c6 is preferably performed on the individual icon images 60 (61 to 6n) along with the processings c1 to c5 described in step S116.

(c6) The generation unit 142a adds a decoration to an icon image so that a user can identify a difference in an extraction source apparatus of information on the icon image. For example, a frame which borders a circumference of an icon image of the head mounted display 100a is made to be displayed differently from a frame which borders a circumference of an icon image of the smart phone 300. In addition, for example, a color of an icon image of the head mounted display 100a is made different from a color of an icon image of the smart phone 300. Further, the generation unit 142a may change a shape of an icon image, may change transmittance of an icon image, may change a size of an icon image, and may change a note (text, a graphic, a symbol, or the like) appended to an icon image.

In step S308, the generation unit 142a stores coordinates of the icon images 60 on the frame FM1 in the correspondence relationship 124 in correlation with at least one of positional information or link destination information of the head mounted display 100a. Similarly, the generation unit 142a stores coordinates of the icon images 60 on the frame FM1 in the correspondence relationship 124 in correlation with at least one of positional information or link destination information of the smart phone 300. Details thereof are the same as those of step S118 of the first embodiment.

Figure 14:
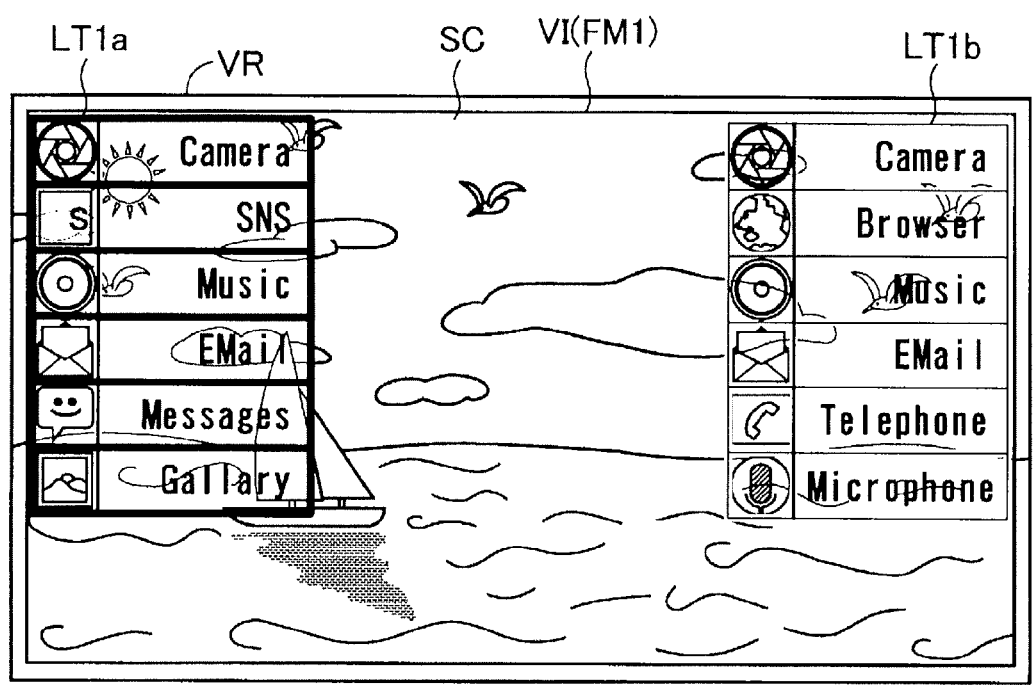
FIG. 14 is a diagram illustrating a state in which a list image of the second embodiment is displayed on the head mounted display.

FIG. 14 is a diagram illustrating a state in which a list image of the second embodiment is displayed on the head mounted display 100a. In addition, FIG. 14 illustrates a list image generated by using the frame FM1 in which the image list LT1a is disposed at a left end of the region of the frame FM1, and the image list LT1b is disposed at a right end thereof. Icon images of the smart phone 300 are disposed in the image list LT1a on the basis of the information on an icon image acquired from the smart phone 300. In addition, icon images of the head mounted display 100a are disposed in the image list LT1b on the basis of the information on an icon image acquired from the head mounted display 100a. Further, the icon images disposed in the image list LT1a are decorated by using thick borders, and the icon images disposed in the image list LT1b are decorated by using thin borders.

As mentioned above, according to the rearrangement process of the second embodiment, the image display unit 20 allows a user to visually recognize both icon images of the smart phone 300 (external apparatus) and icon images of the head mounted display 100a in a mode in which the icon images can be differentiated from each other, and thus can improve convenience for the user. In addition, in FIG. 14, for convenience of description, a state in which the image lists LT1a and LT1b are folded is not illustrated. However, in the same manner as in FIGS. 6A and 6B, the image lists LT1a and LT1b may be folded.

B-4. Notification Process

A notification process of the second embodiment is substantially the same as that of the first embodiment illustrated in FIG. 7. However, in step S204, the notification unit 144a transmits positional information or link destination information to an extraction source apparatus of an operated icon image. In other words, in a case where an extraction source apparatus of an operated icon image is the head mounted display 100a, the notification unit 144a transmits positional information or link destination information to the OS 150. On the other hand, in a case where an extraction source apparatus of an operated icon image is the smart phone 300, the notification unit 144a transmits positional information or link destination information to the smart phone 300. Then, the process described in step S206 is performed in either the OS 150 of the head mounted display 100a or the smart phone 300 which has received the positional information or the link destination information.

D. Modification Examples

In the above-described embodiments, some of the constituent elements implemented by hardware may be implemented by software, and, conversely, some of the configurations implemented by software may be implemented by hardware. In addition, the following modifications may also occur.

Modification Example 1

In the above-described embodiments, a configuration of the image display system has been exemplified. However, any configuration of the image display system may be defined within the scope without departing from the spirit of the invention, and, for example, each device forming the image display system may be added, deleted, changed, or the like. In addition, a network configuration of the device forming the image display system may be changed.

For example, a head mounted display may be connected to a plurality of external apparatuses (for example, a smart phone and a PDA). In this case, in the same manner as in the second embodiment, the generation unit may generate a list image in which an icon image of a first external apparatus, an icon image of a second external apparatus, and an icon image of an m-th (where m is an integer of 3 or more) external apparatus are arranged in a mode in which the icon images can be differentiated from each other. Accordingly, the image display unit allows a user to visually recognize icon images of a plurality of external apparatuses in a mode in which the icon images can be differentiated from each other, and thus it is possible to further improve convenience for a user.

For example, a cloud server using the Internet INT may be used as (at least one of) external apparatuses. Even in this case, the generation unit performs the same process as the process in the first and second embodiments, and thus it is possible to achieve the same effect as the effect of the first embodiment and the second embodiment.

In the above-described embodiments, as a specific example of "a plurality of images of an external apparatus", "icon images displayed on a display screen of the external apparatus" have been described. However, a plurality of images of an external apparatus may be images stored in the external apparatus, and are not necessarily limited to an image which is "displayed" on the external apparatus, or an "icon" image of the external apparatus.

Modification Example 2

In the above-described embodiments, a configuration of the head mounted display has been exemplified. However, any configuration of the head mounted display may be defined within the scope without departing from the spirit of the invention, and, for example, each configuration unit may be added, deleted, changed, or the like.

In the above-described embodiments, the allocation of the constituent elements to the control unit and the image display unit are only an example, and may employ various aspects. For example, the following aspects may be employed: (i) an aspect in which a processing function such as a CPU and a memory is mounted in the control unit, and only a display function is mounted in the image display unit; (ii) an aspect in which a processing function such as a CPU and a memory is mounted in both the control unit and the image display unit; (iii) an aspect in which the control unit and the image display unit are integrally formed (for example, an aspect in which the image display unit includes the control unit and functions as a wearable computer); (iv) an aspect in which a smart phone or a portable game machine is used instead of the control unit; (v) an aspect in which the control unit and the image display unit are configured to communicate with each other and to be supplied with power in a wireless manner so as to remove the connection unit (cords); and (vi) an aspect in which the touch pad is removed from the control unit, and the touch pad is provide in the image display unit.

In the above-described embodiments, for convenience of description, the control unit is provided with the transmission unit, and the image display unit is provided with the reception unit. However, both of the transmission unit and the reception unit of the above-described embodiments have a bidirectional communication function, and thus can function as a transmission and reception unit. In addition, for example, the control unit illustrated in FIG. 5 is connected to the image display unit via the wired signal transmission path. However, the control unit and the image display unit may be connected to each other via a wireless signal transmission path such as a wireless LAN, infrared communication, or Bluetooth (registered trademark).

For example, configurations of the control unit and the image display unit illustrated in FIG. 2 may be arbitrarily changed. Specifically, for example, the control unit may be provided with not only the above-described various input devices (a touch pad, a cross key, a foot switch, a gesture detection device, a visual line detection device, and a microphone) but also various input devices (for example, an operation stick, a keyboard, and a mouse). For example, in the above-described embodiments, a secondary battery is used as the power supply, but the power supply is not limited to the secondary battery and may use various batteries. For example, a primary battery, a fuel cell, a solar cell, and a thermal cell may be used.

For example, in the above-described embodiments, the head mounted display is a binocular transmission type head mounted display, but may be a monocular head mounted display. In addition, the head mounted display may be a non-transmissive head mounted display through which external scenery is blocked from being transmitted in a state in which the user wears the head mounted display. Further, as an image display unit, instead of the image display unit which is worn as glasses, other types of image display units such as an image display unit which is worn as, for example, a cap, may be employed. In addition, the earphone may employ an ear-mounted type or a head band type, or may be omitted. Further, for example, a head-up display (HUD) may be configured to be mounted in a vehicle such as an automobile or an airplane. Furthermore, for example, the head mounted display may be configured to be built in a body protection tool such as a helmet.

Figure 15A:
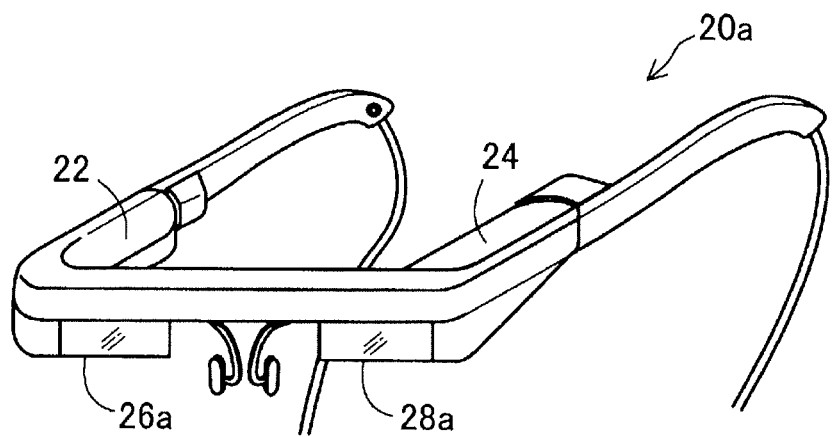
FIGS. 15A and 15B are diagrams illustrating exterior configurations of head mounted displays in a modification example.
Figure 15B:
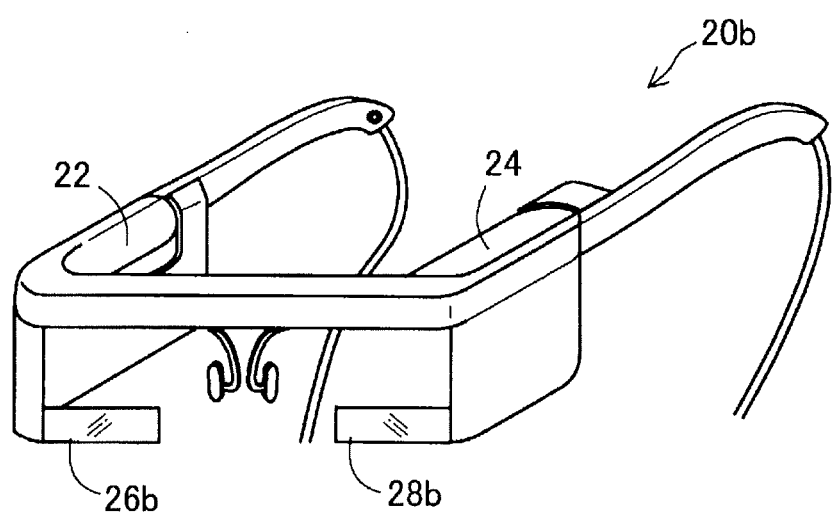

FIGS. 15A and 15B are diagrams illustrating exterior configurations of head mounted displays in a modification example. In an example of FIG. 15A, an image display unit 20a includes a right optical image display unit 26a instead of the right optical image display unit 26 and a left optical image display unit 28a instead of the left optical image display unit 28. The right optical image display unit 26a and the left optical image display unit 28a are formed to be smaller than the optical members of the first embodiment, and are disposed on the obliquely upper side of the right eye and the left eye of the user when the head mounted display is mounted. In an example of FIG. 15B, an image display unit 20b includes a right optical image display unit 26b instead of the right optical image display unit 26 and a left optical image display unit 28b instead of the left optical image display unit 28. The right optical image display unit 26b and the left optical image display unit 28b are formed to be smaller than the optical members of the first embodi-ment, and are disposed on the obliquely lower side of the right eye and the left eye of the user when the head mounted display is mounted. As above, the optical image display units have only to be disposed near the eyes of the user. Any size of the optical member forming the optical image display units may be used, and the head mounted display may be implemented in an aspect in which the optical image display units cover only a part of the eyes of the user; in other words, the optical image display units do not completely cover the eyes of the user. In addition, also in a case where the configurations as in FIGS. 15A and 15B are employed, it is possible to appropriately adjust an arrangement of the plurality of images of the external apparatus so as to be a mode suitable for the head mounted display while improving visibility from a user. In this case, an arrangement is not limited to the examples of an arrangement described in the above embodiments.

For example, in the above-described embodiments, the display driving unit is configured using the backlight, the backlight control portion, the LCD, the LCD control portion, and the projection optical system. However, the above aspect is only an example. The display driving unit may include a configuration unit for implementing other types along with this configuration unit or instead of this configuration unit. For example, the display driving unit may include an organic electroluminescent (EL) display, an organic EL controller, and a projection optical system. In addition, for example, the display driving unit may use a digital micromirror device may be used instead of the LCD. Further, for example, the invention is applicable to a laser retinal projective head mounted display.

For example, description has been made that the function units such as the generation unit, the notification unit, the image processing unit, the display control unit, and the sound processing unit are implemented by the CPU developing a computer program stored in the ROM or the hard disk on the RAM and executing the program. However, these function units may be configured using an application specific integrated circuit (ASIC) which is designed for implementing each of the corresponding functions.

Modification Example 3

In the above-described embodiments, an example of the rearrangement process has been described. However, the procedure of the rearrangement process is only an example, and various modifications may occur. For example, some steps may be omitted, and other steps may be added. In addition, an order of executed steps may be changed.

For example, the generation unit may generate a list image without using a frame. Specifically, in step S116, the generation unit may generate a list image by disposing icon images at predefined coordinate positions, instead of the frame. As another example, in step S116, the generation unit may generate a list image by disposing icon images at coordinate positions which are dynamically calculated from acquired sizes of the icon image. Accordingly, it is possible to generate a list image without needing the frame information.

For example, the generation unit may dynamically generate a list image so as to avoid a visual line direction of a user. Specifically, a configuration (also referred to as a "visual line direction detection unit") of detecting a visual line direction, such as a camera capturing an image of the eyes of the user or an infrared sensor, is added to the above-described head mounted display. In step S116, the generation unit may select a frame in which an image list is disposed on an opposite side to a detected visual line direction, from among a plurality of frames stored in the frame information. As another example, in step S116, in a case where a frame includes a plurality of image lists as in FIG. 10, the generation unit may preferentially select an image list on opposite side to a detected visual line direction from among the plurality of image lists, so as to arrange icon images. Accordingly, it is possible to arrange dynamic icon images which avoid a visual line direction of a user in a list image.

For example, the filtering in step S112 may be omitted. In addition, the filtering in step S112 may be performed between the collection (step S108) of information on an icon image and the transmission (step S110) of the information on an icon image on the smart phone side.

For example, either one or both of the grouping and the sorting in step S114 may be omitted. In addition, the grouping and the sorting in step S114 may be performed between the collection (step S108) of information on an icon image and the transmission (step S110) of the information on an icon image on the smart phone side.

For example, an icon image described in the above embodiments is assumed to be an image which is expressed in a two-dimensional manner. However, the image processing unit may express an icon image in a three-dimensional manner by making right eye image data and left eye image data different from each other.

For example, either one of the authentication of the smart phone in step S104 and the establishment of connection in step S106 may be omitted, and an executed order may be changed.

Modification Example 4

In the above-described embodiments, an example of the notification process has been described. However, the procedure of the notification process is only an example, and various modifications may occur. For example, some steps may be omitted, and other steps may be added. In addition, an order of executed steps may be changed.

Modification Example 5

In the above-described embodiments, a coordinate of an icon image has been exemplified as positional information, and a link destination of an icon image has been exemplified as link destination information. However, the positional information may be information for identifying a position of an icon image in a smart phone (external apparatus), and is not limited to a coordinate. Similarly, the link destination information may be information for identifying a link destination of an icon image in a smart phone, and is not limited to a link destination (file path) of an execution file.

Modification Example 6

In the second embodiments, an example of a frame stored in the frame information has been described. However, details of the frame are only an example, and various modifications may occur. For example, constituent elements may be added, deleted, or changed.

For example, each of the frame FM1 (FIG. 3) and the frame FM2 (FIG. 8) of the embodiments has a single image list LT1 or LT2. However, such a frame may have a plurality of image lists.

For example, sizes of the regions or aspect ratios of the frame FM1, the frame FM2, and the frame FM3 (FIG. 10) may be arbitrarily set. An aspect ratio of the frame may be different from an aspect ratio of the display element of the head mounted display.

For example, a shape, a size and the number of image frames in the image list disposed in each of the frame FM1, the frame FM2, and the frame FM3 may be arbitrarily set. Further, in a case where such a frame includes a plurality of image lists, the number of image frames may be different between a certain image list and other image lists.

Modification Example 7

The invention is not limited to the above-described embodiments or modification examples, and may be implemented using various configurations within the scope without departing from the spirit thereof. For example, the embodiments corresponding to technical features of the respective aspects described in Summary and the technical features in the modification examples may be exchanged or combined as appropriate in order to solve some or all of the above-described problems, or in order to achieve some or all of the above-described effects. In addition, if the technical feature is not described as an essential feature in the present specification, the technical feature may be deleted as appropriate.

The entire disclosure of Japanese Patent Application No. 2013-183630, filed Sep. 5, 2013 is expressly incorporated by reference herein.

What is claimed is:

1. A head mounted display which allows a user wearing the head mounted display to visually recognize a virtual image and external scenery, comprising:
    a processor configured to:
        acquire a plurality of images from an external apparatus that is connected to the head mounted display and is outside of a field of view of the user, the plurality of images having a first arrangement in the external apparatus; and
        generate a list image by rearranging the plurality of images of the external apparatus from the first arrangement to a second arrangement different from the first arrangement,
        the processor being configured to generate the list image in which the plurality of images have the second arrangement by filtering the plurality of images from the external apparatus such that the list image only contains images of the plurality of images which satisfy a predetermined condition,
        the predetermined condition including at least one of (i) an image being associated with an executable software application which can be executed by the user in the head mounted display, and (ii) an image being associated with an executable software application which has a frequency of use in the head mounted display greater than a predetermined frequency,
        wherein a different executable software application is associated with each of the plurality of images;
    an image display that allows the user to visually recognize the generated list image as the virtual images; and
    an input that detects a first operation on a first image in the list image of the head mounted display performed by the user, wherein
    in response to the input detecting the first operation, the processor is configured to transmit to the external apparatus at least one of positional information indicating coordinates of the first image in the external apparatus and link destination information indicating a link destination of the first image in the external apparatus.

2. The head mounted display according to claim 1, wherein
the processor is further configured to generate the list image by changing a position of an arrangement of the plurality of acquired images to a position avoiding a central part of the virtual image.

3. The head mounted display according to claim 1, wherein
the processor is further configured to:
acquire the plurality of images, and at least one of positional information for identifying each of positions of the plurality of images in the external apparatus and link destination information for identifying each of link destinations of the plurality of images in the external apparatus,
when the list image is generated, store the plurality of images in correlation with the positional information of the images or the link destination information of the images, and
notify the external apparatus of at least one of the positional information of the first image and the link destination information of the first image by using the correlation.

4. The head mounted display according to claim 1, wherein
the processor is further configured to, when the list image is generated, perform at least one of change of shapes, change of transmittance, change of colors, change of sizes, and addition of decorations, on the plurality of acquired images.

5. The head mounted display according to claim 1, wherein
the plurality of images include at least an icon image for activating an application installed on the external apparatus.

6. The head mounted display according to claim 1, wherein
the processor is further configured to dispose a plurality of images of the head mounted display in the list image in a mode in which the images of the head mounted display can be differentiated from the plurality of images of the external apparatus.

7. The head mounted display according to claim 1, wherein
at least one of the positional information and the link destination information comprises a character string.

8. A method of controlling a head mounted display which allows a user wearing the head mounted display to visually recognize a virtual image and external scenery, comprising:
(a) acquiring a plurality of images from an external apparatus that is connected to the head mounted display and is outside of a field of view of the user, the plurality of images having a first arrangement in the external apparatus;
(b) generating a list image by rearranging the plurality of images from the first arrangement to a second arrangement different from the first arrangement,
the list image in which the plurality of images have the second arrangement being generated by filtering the plurality of images from the external apparatus such that the list image only contains images of the plurality of images which satisfy a predetermined condition,
the predetermined condition including at least one of (i) an image being associated with an executable software application which can be executed by the user in the head mounted display, and (ii) an image being associated with an executable software application which has a frequency of use in the head mounted display greater than a predetermined frequency,
wherein a different executable software application is associated with each of the plurality of images;
(c) allowing the user to visually recognize the generated list image as the virtual image;
(d) detecting on an input a first operation on a first image in the list image of the head mounted display performed by the user; and
(e) in response to the detecting of the first operation on the input, transmitting to the external apparatus at least one of positional information indicating, coordinates of the first image in the external apparatus and link destination information indicating a link destination of the first image in the external apparatus.

9. The method according to claim 8, wherein
at least one of the positional information and the link destination information comprises a character string.

10. An image display system comprising:
a head mounted display that allows a user wearing the head mounted display to visually recognize a virtual image and external scenery; and
an external apparatus that is connected to the head mounted display and is outside of a field of view of the user, the external apparatus including:
a transmitter that acquires a plurality of images of the external apparatus and transmits the plurality of acquired images to the head mounted display, the plurality of images having a first arrangement in the external apparatus, wherein
the head mounted display includes:
a processor configured to:
acquire the plurality of acquired images transmitted from the external apparatus; and
generate a list image by rearranging the plurality of acquired images from the first arrangement to a second arrangement different from the first arrangement,
the processor being configured to generate the list image in which the plurality of images have the second arrangement by filtering the plurality of images from the external apparatus such that the list image only contains images of the plurality of images which satisfy a predetermined condition,
the predetermined condition including at least one of (i) an image being associated with an executable software application which can be executed by the user in the head mounted display, and (ii) an image being associated with an executable software application which has a frequency of use in the head mounted display greater than a predetermined frequency,
wherein a different executable software application is associated with each of the plurality of images;
an image display that allows the user to visually recognize the generated list image as the virtual images; and
an input that detects a first operation on a first image in the list image of the head mounted display performed by the user, wherein
in response to the input detecting the first operation, the processor is configured to transmit to the external apparatus at least one of positional information indicating coordinates of the first image in the external apparatus and link destination information indicating a link destination of the first image in the external apparatus.

11. The image display system according to claim 10, wherein at least one of the positional information and the link destination information comprises a character string.

* * * * *